US012160268B2

(12) United States Patent
Ito et al.

(10) Patent No.: US 12,160,268 B2
(45) Date of Patent: Dec. 3, 2024

(54) COMMUNICATION SYSTEM, COMMUNICATION METHOD, ACCOMMODATION STATION DEVICE AND BASE STATION DEVICE

(71) Applicant: Nippon Telegraph and Telephone Corporation, Tokyo (JP)

(72) Inventors: Kota Ito, Musashino (JP); Mizuki Suga, Musashino (JP); Yushi Shirato, Musashino (JP); Naoki Kita, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 85 days.

(21) Appl. No.: 18/012,810

(22) PCT Filed: Jun. 25, 2020

(86) PCT No.: PCT/JP2020/024950
§ 371 (c)(1),
(2) Date: Dec. 23, 2022

(87) PCT Pub. No.: WO2021/260870
PCT Pub. Date: Dec. 30, 2021

(65) Prior Publication Data
US 2023/0261746 A1    Aug. 17, 2023

(51) Int. Cl.
*H04B 10/2575* (2013.01)
*H04B 10/61* (2013.01)

(52) U.S. Cl.
CPC ..... *H04B 10/25759* (2013.01); *H04B 10/614* (2013.01)

(58) Field of Classification Search
CPC .......... H04B 10/25753; H04B 10/2575; H04B 10/614; H04B 10/25759; H04B 10/25754;
(Continued)

(56) References Cited

U.S. PATENT DOCUMENTS 5,905,585 A * 5/1999 Shirai ................ H04B 10/2589
370/242
7,013,087 B2 * 3/2006 Suzuki ............. H04B 10/25755
398/43
(Continued)

FOREIGN PATENT DOCUMENTS

JP    2004350221        12/2004
JP    2004350221 A  *  12/2004    ............. H04B 10/00

OTHER PUBLICATIONS

Chowdhury et al., "Advanced System Technologies and Field Demonstration for In-Building Optical-Wireless Network With Integrated Broadband Services," Journal of Lightwave Technology, 2009, 27(12):1920-1927.
(Continued)

*Primary Examiner* — Hibret A Woldekidan
(74) *Attorney, Agent, or Firm* — Fish & Richardson P.C.

(57) ABSTRACT

A communication system includes a central station device and a base station device. The central station device includes: a plurality of signal processing units, each generating an electrical signal of a wireless signal by performing signal processing corresponding to a wireless system; a conversion unit that generates an optical signal by performing intensity modulation on the electrical signal; and a signal processing control unit that controls the conversion unit to generate an optical signal in which a plurality of the electrical signals are multiplexed. The base station device includes: an electrical signal generation unit that receives the optical signal generated in the central station device via an optical transmission path and converts the received optical signal into a plurality of electrical signals; and a plurality of antenna devices, each wirelessly transmitting the wireless signal according to the electrical signal generated by the electrical signal generation unit.

9 Claims, 29 Drawing Sheets

(58) Field of Classification Search
CPC ......... H04B 10/25756; H04B 10/25758; H04J 14/0298; H04J 14/02; H04J 14/02764; H01Q 3/2676; H04W 88/085; H04W 24/02; H04W 40/02; H04W 76/10; H04W 76/12; H04W 76/19; H04W 84/18; H04W 88/08; H04W 48/00; H04W 74/00; H04W 74/02; H04W 76/00

See application file for complete search history.

(56) References Cited

U.S. PATENT DOCUMENTS

2002/0048071 A1* 4/2002 Suzuki ............. H04B 10/25755
 398/141
2019/0149236 A1* 5/2019 Wang ................. H04W 88/085
 398/48

OTHER PUBLICATIONS

Thomas et al., "Performance Improvement and Cost Reduction Techniques for Radio Over Fiber Communications," IEEE Communication Surveys & Tutorials, 2015, 17(2):627-670.

* cited by examiner

COMMUNICATION SYSTEM, COMMUNICATION METHOD, ACCOMMODATION STATION DEVICE AND BASE STATION DEVICE

CROSS-REFERENCE TO RELATED APPLICATIONS

This application is a National Stage application under 35 U.S.C. § 371 of International Application No. PCT/JP2020/024950, having an International Filing Date of Jun. 25, 2020, the disclosure of which is considered part of the disclosure of this application, and is incorporated by reference in its entirety into this application.

TECHNICAL FIELD

The present invention relates to a communication system, a communication method, a central station device, and a base station device.

BACKGROUND ART

Recently, as a technique for implementing large capacity wireless transmission, a wireless transmission technology using high-frequency bands such as millimeter waves or the like has been attracting attention. However, there is a large propagation loss with wireless signals of high frequency bands. Thus, it is necessary to place wireless base stations with high density.: In order to overcome such an issue, RoF (Radio over Fiber) is applied. By applying RoF and consolidating a signal processing unit within a central station, it is possible to simplify the configuration of a remote radio unit and implement economical cell formation. Furthermore, by applying RoF, it is also possible to collectively modify the technology and devices on the central station side (see Non-Patent Literature 1).

Furthermore, conventionally, it is necessary to place a wireless base station for each wireless system. However, it has been also discussed to integrate a plurality of wireless systems in a single wireless base station by applying RoF (see Non-Patent Literature 2).

CITATION LIST

Non-Patent Literature

Non-Patent Literature 1: V. A. Thomas, M. El-Hajjar and L. Hanzo, "Performance Improvement and Cost Reduction Techniques for Radio Over Fiber Communications", in IEEE Communications Surveys & Tutorials, vol. 17, no. 2, pp. 627-670, Second Quarter 2015.
Non-Patent Literature 2: A. Chowdhury, H. Chien, Y. Hsueh and G. Chang, "Advanced System Technologies and Field Demonstration for In-Building Optical-Wireless Network with Integrated Broadband Services", in Journal of Lightwave Technology, vol. 27, no. 12, pp. 1920-1927 Jun. 15, 2009.

SUMMARY OF THE INVENTION

Technical Problem

However, it is an issue that an arbitrary number of wireless systems cannot be integrated. For example, with the technique disclosed in Non-Patent Literature 2, even though it is possible to integrate prescribed wireless systems (Wi-Fi®, WiMAX®, MMW (Millimeter Wave)), it is difficult to integrate new wireless systems other than those.

In view of the foregoing circumstance, it is an object of the present invention to provide, in regards to the technique for transmitting high frequency band signals via optical fibers, a technique that makes it possible to integrate and accommodate the wireless systems more flexibly.

Means for Solving the Problem

An aspect of the present invention is a communication system that includes a central station device and a base station device. The central station device includes: a plurality of signal processing units, each generating an electrical signal of a wireless signal by performing signal processing corresponding to a wireless system; an E/O conversion unit that generates an optical signal by performing intensity modulation on the electrical signal; and a signal processing control unit that controls the E/O conversion unit to generate an optical signal in which a plurality of the electrical signals are multiplexed. The base station device includes: an electrical signal generation unit that receives the optical signal generated in the central station device via an optical transmission path and converts the received optical signal into a plurality of electrical signals; and a plurality of antenna devices, each wirelessly transmitting the wireless signal according to the electrical signal generated by the electrical signal generation unit.

Another aspect of the present invention is a communication method that includes: a signal processing step of generating a plurality of electrical signals of wireless signals by performing signal processing corresponding to wireless systems; an E/O conversion step of generating and outputting an optical signal to an optical transmission path by performing intensity modulation on the plurality of electrical signals; an electrical signal generation step of receiving the optical signal via the optical transmission path and converting the received optical signal into a plurality of electrical signals; and a wireless transmission step of wirelessly transmitting each of the electrical signals from antenna devices corresponding to the electrical signals generated in the electrical signal generation step.

Still another aspect of the present invention is a central station device that includes: a plurality of signal processing units, each generating an electrical signal of a wireless signal by performing signal processing corresponding to a wireless system; an E/O conversion unit that generates an optical signal by performing intensity modulation on the electrical signal, and outputs the optical signal to an optical transmission path; and a signal processing control unit that controls the E/O conversion unit to generate an optical signal in which a plurality of the electrical signals are multiplexed.

Yet another aspect of the present invention is a base station device that includes: an electrical signal generation unit that receives the optical signal generated in the central station device according to the foregoing aspect via an optical transmission path and converts the received optical signal into a plurality of electrical signals; and a plurality of antenna devices, each wirelessly transmitting the wireless signal according to the electrical signal generated by the electrical signal generation unit.

Effects of the Invention

As for the technique for transmitting high frequency band signals via optical fibers, the present invention makes it possible to integrate and accommodate the wireless systems more flexibly.

DESCRIPTION OF EMBODIMENTS

Embodiments of the present invention will be described in detail with reference to the accompanying drawings.

(Basic Configuration)

Figure 1:
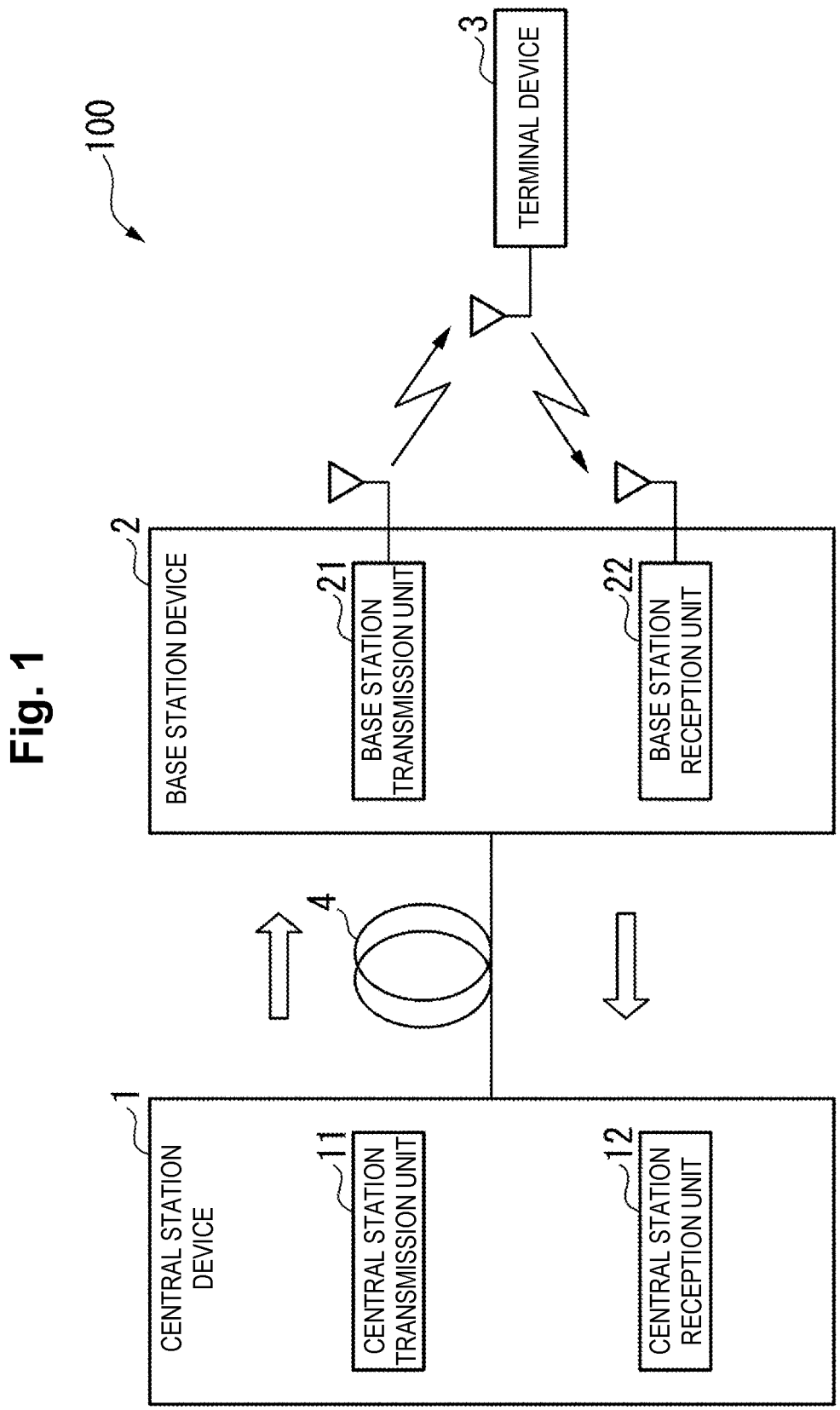
FIG. 1 is a diagram illustrating a system configuration example of a basic configuration of a communication system 100 according to the present invention.

FIG. 1 is a diagram illustrating a system configuration example of a basic configuration of a communication system 100 according to the present invention. The communication system 100 includes a central station device 1, a base station device 2, a terminal device 3, and an optical transmission path 4. The optical transmission path 4 is configured by using an optical fiber, for example. More specifically, in a case where there is only communication of a downstream direction from the central station device 1 toward the terminal device 3, the optical transmission path 4 may be configured by using single-core optical fibers. In a case where there is also communication in an upstream direction from the terminal device 3 toward the central station device 1 in addition to the communication in the downstream direction, the optical transmission path 4 may be configured by using double-core or multiple-core optical fibers. Such a communication system 100 may be configured by applying RoF, for example.

In FIG. 1, as the devices for processing the downstream communication, a central station transmission unit 11 and a base station transmission unit 21 are provided. In FIG. 1, as the devices for processing the upstream communication, a central station reception unit 12 and a base station reception unit 22 are provided. As illustrated in FIG. 1, each of the devices for processing the downstream communication and the devices for processing the upstream communication may be provided as separate hardware, or a part of or a whole part thereof may be provided as common hardware. While the devices for processing the downstream communication and the devices for processing the upstream communication will be described hereinafter independently from each other, the configuration is not limited thereto. For example, an antenna device and a signal processing unit may be provided in common for the upstream communication and the downstream communication.

The central station device 1 includes the central station transmission unit 11 that performs processing regarding downlink signals. The central station transmission unit 11 receives a downlink signal transmitted from a host device, not illustrated, directed toward the terminal device 3. The central station transmission unit 11 performs intensity modulation (E/O conversion) for an optical signal with a wireless signal that is a downlink signal. The central station transmission unit 11 transmits the intensity-modulated optical signal to the base station device 2 via the optical transmission path 4.

The base station device 2 includes the base station transmission unit 21 that performs processing regarding downlink signals. Upon receiving the optical signal via the optical transmission path 4, the base station transmission unit 21 generates a wireless signal by performing O/E conversion on the received optical signal. The base station transmission unit 21 wirelessly transmits the generated wireless signal (downlink signal) from an antenna. The terminal device 3 receives the downlink signal wirelessly transmitted from the base station device 2.

Hereinafter, three specific embodiments will be described in regards to the communication system 100 of the present invention. In the first embodiment, optical communication is performed by using subcarrier multiplexing (SCM) between the central station device 1 and the base station device 2. In the second embodiment, optical communication is performed by using wavelength division multiplexing (WDM) between the central station device 1 and the base station device 2. In the third embodiment, optical communication is performed by using subcarrier multiplexing and wavelength division multiplexing between the central station device 1 and the base station device 2.

First Embodiment

Figure 2:
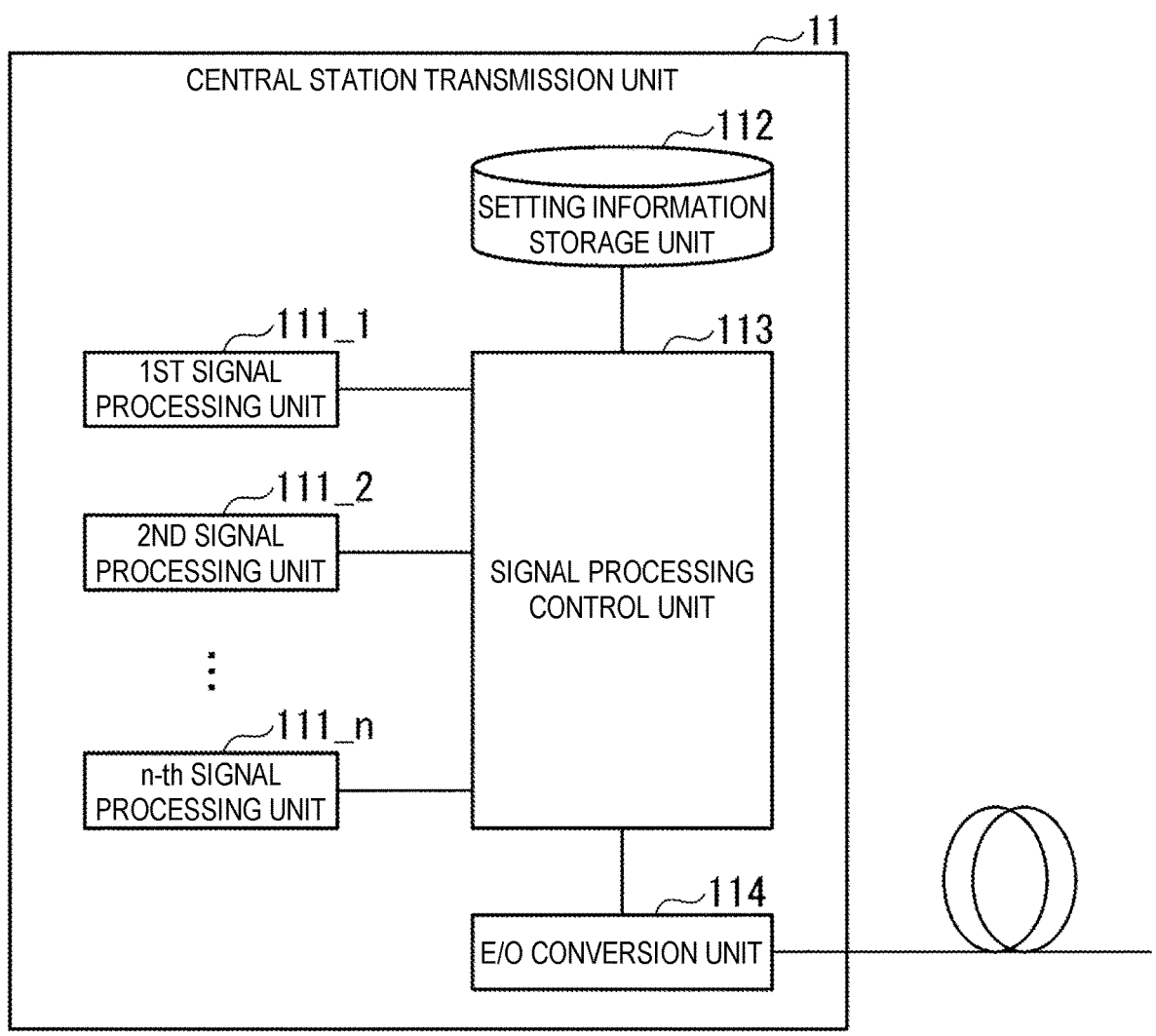
FIG. 2 is a diagram illustrating a functional configuration example of a central station transmission unit 11 according to a first embodiment.

FIG. 2 is a diagram illustrating a functional configuration example of the central station transmission unit 11 according to the first embodiment. In the first embodiment, communication is performed by using SCM (subcarrier multiplexing) via the optical transmission path 4. The central station transmission unit 11 includes a plurality of signal processing units 111 (111_1 to 111_n: 'n' is an integer of 2 or larger), a setting information storage unit 112, a signal processing control unit 113, and an E/O conversion unit 114.

The signal processing unit 111 operates in accordance with the type of wireless system allocated in advance. The type of wireless system allocated to the signal processing unit 111 may be any one of Wi-Fi®, WiMAX®, MMW (Millimeter Wave)), for example, or may be other types different from those specific examples. For example, the type of the wireless system allocated to the signal processing unit 111 may be LTE (Long Term Evolution), LTE advanced, 5G, or other wireless systems. The signal processing unit 111 performs signal processing such as modulation processing on the signals received from the host device according to the specifications of each of the wireless systems. The signal processing unit 111 outputs, to the signal processing control unit 113, an electrical signal (wireless signal: RF signal: Radio Frequency signal) generated as a result of the signal processing.

The setting information storage unit 112 is configured by using a storage device such as a magnetic hard disk device, a semiconductor memory device, or the like. The setting information storage unit 112 stores information regarding multiplexing of the electrical signals outputted from each of the signal processing units 111. The setting information storage unit 112 may store information indicating a subcarrier to which the signal outputted from each of the signal processing units 111 is allocated, for example. The information indicating the subcarrier may be a value indicating the identification number of the subcarrier or information indicating the frequency band of the subcarrier, for example.

The signal processing control unit 113 generates a multiplex signal by multiplexing the electrical signals outputted from the plurality of signal processing units 111 by frequency division multiplexing (FDM). When the frequency used in the wireless systems applied to each of the signal processing units 111 varies, the signal processing control unit 113 can generate the multiplex signal by simply adding each of the electrical signals. The signal processing control unit 113 outputs the generated multiplex signal to the E/O conversion unit 114.

The E/O conversion unit 114 performs intensity modulation on the signal outputted from the signal processing control unit 113 to generate an optical signal of SCM. The E/O conversion unit 114 outputs the generated optical signal to the optical transmission path 4.

Figure 3:
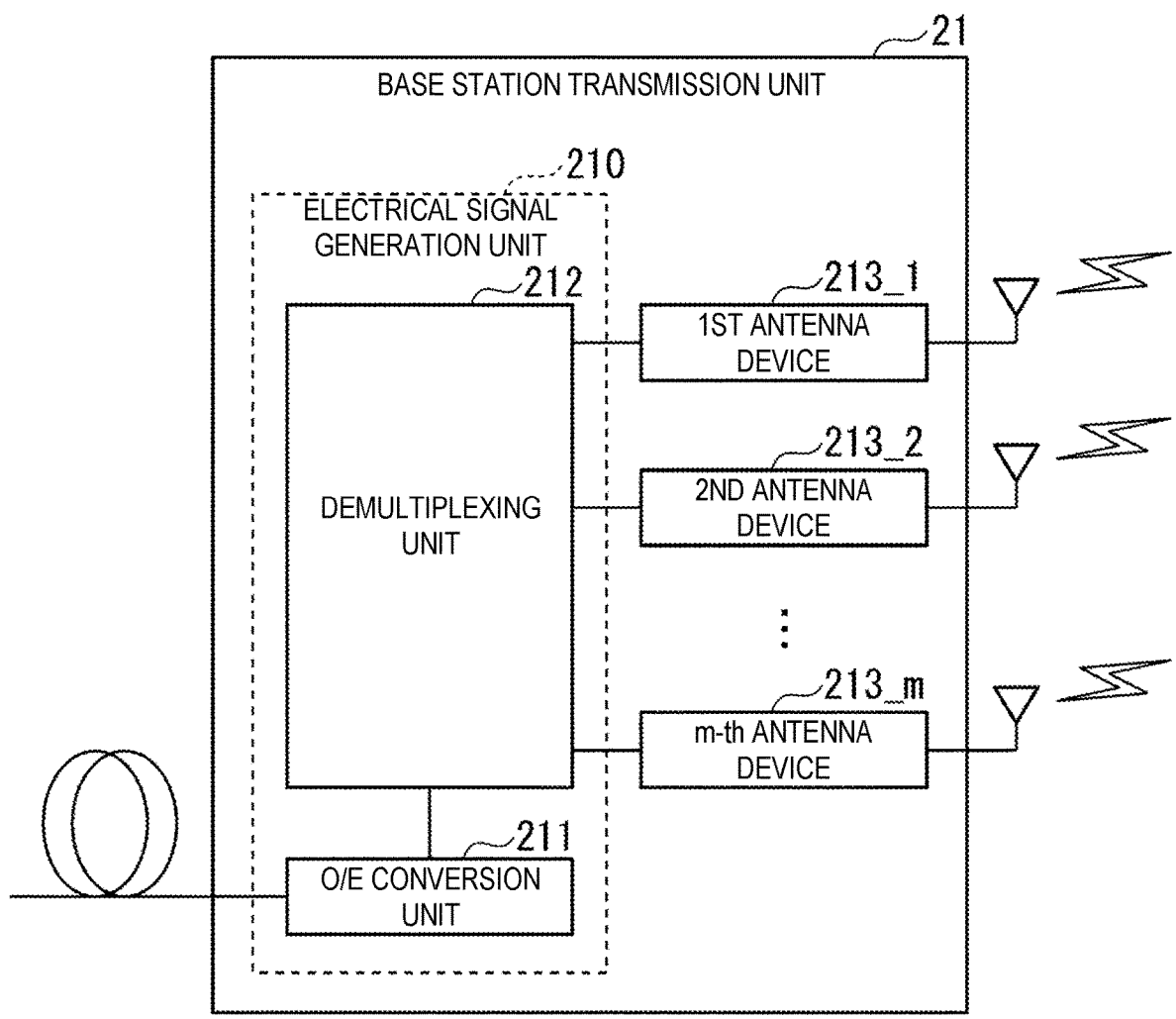
FIG. 3 is a diagram illustrating a functional configuration example of a base station transmission unit 21 according to the first embodiment.

FIG. 3 is a diagram illustrating a functional configuration example of the base station transmission unit 21 according to the first embodiment. The base station transmission unit 21 according to the first embodiment receives the optical signal multiplexed by SCM from the optical transmission path 4. The base station transmission unit 21 includes an electrical signal generation unit 210 and a plurality of antenna devices 213 (213_1 to 213_m: 'm' is an integer of 2 or larger).

The electrical signal generation unit 210 receives the optical signal from the optical transmission path 4, and converts the received optical signal into a plurality of electrical signals. The electrical signal generation unit 210 includes an O/E conversion unit 211 and a demultiplexing unit 212.

The O/E conversion unit 211 generates the electrical signal by demodulating the optical signal received from the optical transmission path 4. The O/E conversion unit 211 outputs the generated electrical signal to the demultiplexing unit 212.

The demultiplexing unit 212 demultiplexes the electrical signal outputted from the O/E conversion unit 211 for the plurality of antenna devices 213. The demultiplexing unit 212 outputs the multiplex signals of each of the frequencies multiplexed by FDM, for example, to the antenna devices 213 set in advance according the frequencies thereof. The demultiplexing unit 212 may be configured to be able to change the corresponding relations of the frequencies and the antenna devices 213.

The antenna device 213 may be configured by using an array antenna, for example. The antenna device 213 emits the electrical signal outputted from the demultiplexing unit 212 into the air as the wireless signal.

Figure 4:
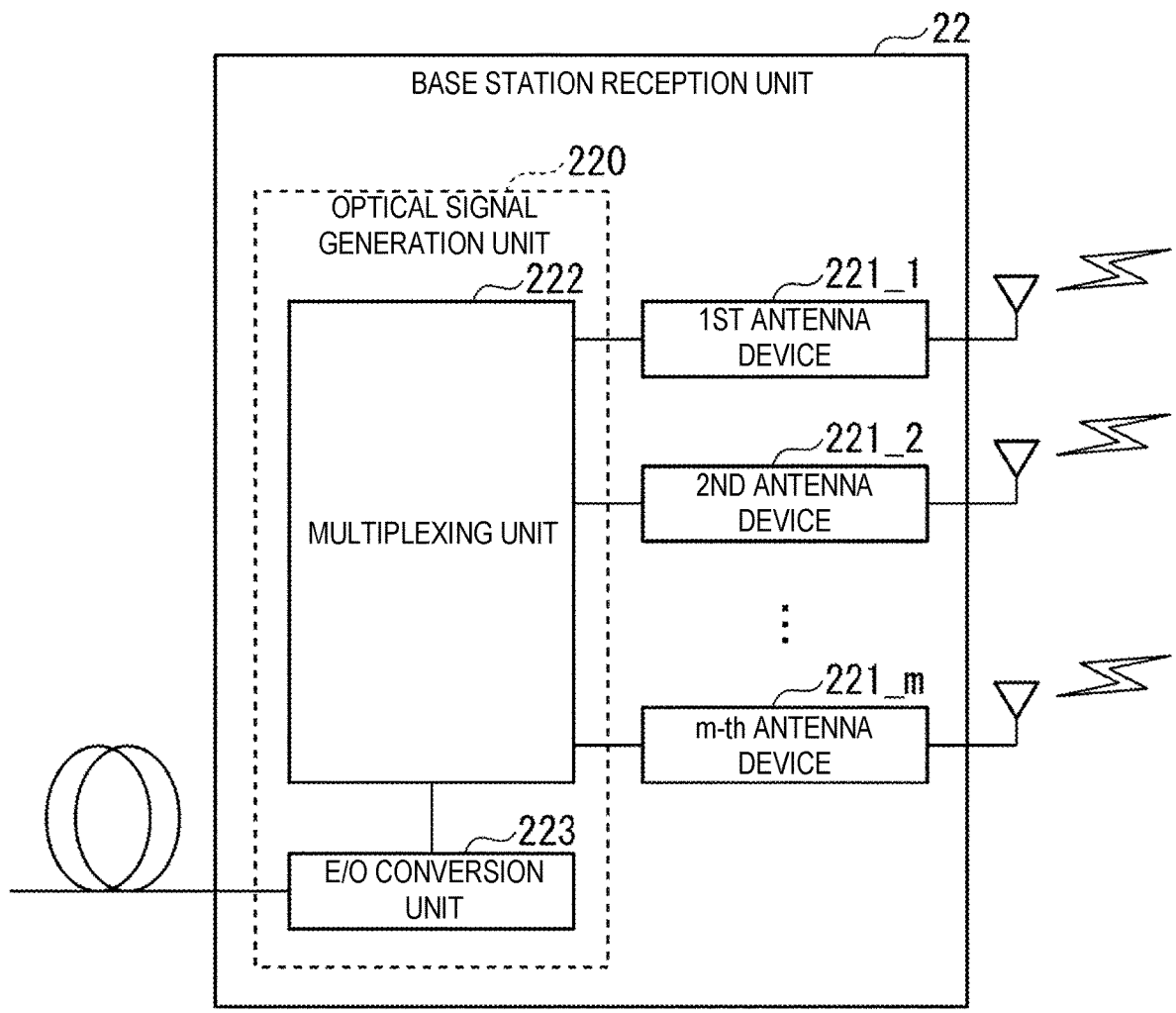
FIG. 4 is a diagram illustrating a functional configuration example of a base station reception unit 22 according to the first embodiment.

FIG. 4 is a diagram illustrating a functional configuration example of the base station reception unit 22 according to the first embodiment. The base station reception unit 22 according to the first embodiment transmits the optical signal multiplexed by SCM to the optical transmission path 4. The base station reception unit 22 includes an optical signal generation unit 220 and a plurality of antenna devices 221 (221_1 to 221_m: 'm' is an integer of 2 or larger). Note that the number of the antenna devices 213 provided to the base station transmission unit 21 and the number of the antenna devices 221 provided to the base station reception unit 22 may be the same or different.

The antenna device 221 may be configured with an array antenna, for example. As for the antenna device 221, there is a limit in the applicable frequency bands. The antenna device 221, upon receiving a wireless signal that is applicable to itself, outputs an electrical signal corresponding to the received wireless signal. For example, the antenna device 221 receives a wireless signal transmitted from the terminal device 3, and generates an electrical signal corresponding to the wireless signal.

The optical signal generation unit 220 generates optical signals to be transmitted to the central station device 1 based on the electrical signals outputted from the plurality of antenna devices 221. The optical signal generation unit 220 includes a multiplexing unit 222 and an E/O conversion unit 223.

The multiplexing unit 222 generates a multiplex signal by multiplexing each of the electrical signals outputted from the plurality of antenna devices 221 by frequency division multiplexing (FDM). When the frequencies that can be received by each of the antenna devices 221 are different, the multiplexing unit 222 can generate a multiplex signal by simply adding each of the electrical signals. The multiplexing unit 222 outputs the generated multiplex signal to the E/O conversion unit 223.

The E/O conversion unit 223 performs intensity modulation on the signal outputted from the multiplexing unit 222 to generate the optical signal of SCM. The E/O conversion unit 223 outputs the generated optical signal to the optical transmission path 4.

Figure 5:
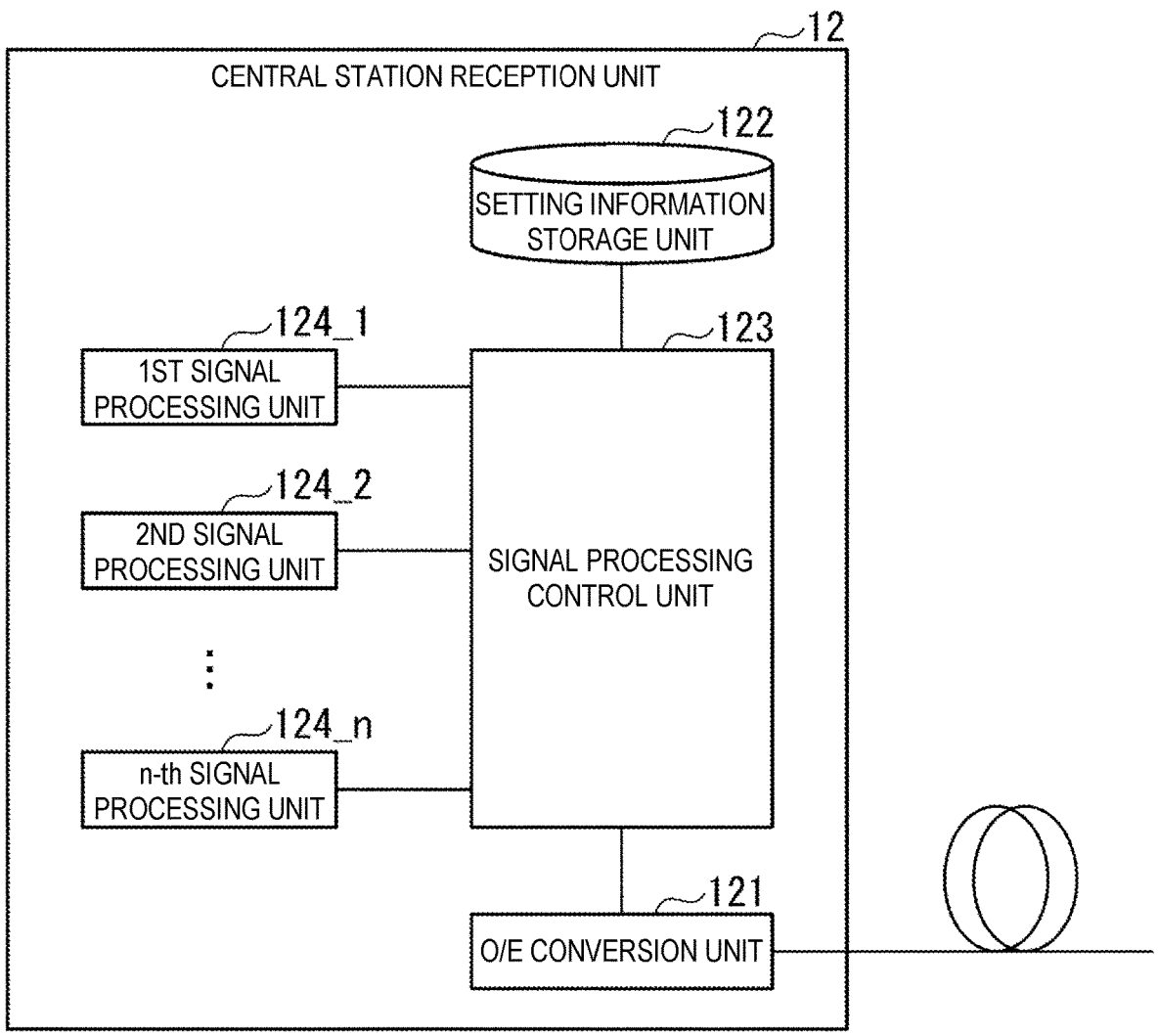
FIG. 5 is a diagram illustrating a functional configuration example of a central station reception unit 12 according to the first embodiment.

FIG. 5 is a diagram illustrating a functional configuration example of the central station reception unit 12 according to the first embodiment. The central station reception unit 12 according to the first embodiment receives the optical signal multiplexed by SCM from the optical transmission path 4. The central station reception unit 12 includes an O/E conversion unit 121, a setting information storage unit 122, a signal processing control unit 123, and a plurality of signal processing units 124 (124_1 to 124_n). Note that the number of the signal processing units 111 provided to the central station transmission unit 11 and the number of the signal processing units 124 provided to the central station reception unit 12 may be the same or different.

The O/E conversion unit 121 generates an electrical signal by demodulating the optical signal received from the optical transmission path 4. The O/E conversion unit 121 outputs the generated electrical signal to the signal processing control unit 123.

The setting information storage unit 122 is configured by using a storage device such as a magnetic hard disk device, a semiconductor memory device, or the like. The setting information storage unit 122 stores information indicating the corresponding relations regarding the electrical signals of each of the frequency bands multiplexed in the signals received at the signal processing control unit 123 and the plurality of signal processing units 124. The setting information storage unit 122 may store the information indicating the relations regarding the signals outputted to each of the signal processing units 124 and the subcarriers to which the signals are allocated, for example.

The signal processing control unit 123 outputs each of the signals multiplexed in the electrical signals outputted from the O/E conversion unit 121 to the corresponding signal processing units 124 based on the information stored in the setting information storage unit 122.

The signal processing unit 124 operates in accordance with the type of the wireless system allocated in advance. The signal processing unit 124 performs signal processing such as demodulation processing on the signals received from the signal processing control unit 123 according to the specifications of each of the wireless systems. The signal processing unit 124 outputs the electrical signal generated as a result of the signal processing to the transmission path directed toward the host device.

In regards to the technique for transmitting high frequency band signals via optical fibers, the first embodiment configured as described above makes it possible to integrate and accommodate the wireless systems more flexibly. Specifically, it is described as follows. In the first embodiment, the plurality of signal processing units 111 corresponding to the wireless systems are provided in the central station transmission unit 11. The electrical signals generated in each of the signal processing units 111 are subcarrier-multiplexed by the signal processing control unit 123 and transmitted to the base station transmission unit 21 via the optical transmission path 4. Then, the electrical signals corresponding to each of the wireless systems are transmitted as the wireless signals from the antenna devices 213 corresponding to the frequencies used for each of the wireless systems. Therefore, unlike the conventional technique (technique disclosed in Non-Patent Literature 2, for example) with which only prescribed wireless systems defined in advance can be accommodated, it becomes possible to accommodate arbitrary various types of wireless systems. This is also the same for uplink signals.

Furthermore, in the first embodiment, it is possible to accommodate a new wireless system or to unassign the already accommodated wireless system by rewriting the information stored in the setting information storage unit 112. As described, with the first embodiment, flexibility for the wireless systems to be accommodated can be improved. This is also the same for uplink signals.

Furthermore, with the first embodiment, a new antenna device can be placed in the base station device 2 by rewriting the information stored in the setting information storage unit 112. As described, with the first embodiment, flexibility for the wireless systems to be accommodated can be improved. This is also the same for uplink signals.

Modification Example of First Embodiment

In a case where the frequency band of the wireless signals used in a plurality of wireless systems is the same, the plurality of wireless systems may be configured to share a single antenna device 213 and antenna device 221. In this case, wireless communication between the terminal device 3 and the base station device 2 in the plurality of wireless systems using the common antenna devices may be performed by time division multiplexing (TDM), for example. Note that the signals of the wireless systems that use different antenna devices may be multiplexed by SCM as described above.

For example, in a case where time division multiplexing is applied, a specific time slot is allocated to each of the plurality of wireless systems using the same antenna devices. The signal processing control unit 113 of the central station transmission unit 11 allocates the electrical signal outputted from each of the signal processing units 111 to the time slot that is allocated to the wireless system of the corresponding signal processing unit 111. The base station transmission unit 21 transmits the signals of each of the frequency bands received via the optical transmission path 4 from the antenna device 213, so that time division multiplexing can be implemented in a wireless section.

The multiplexing unit 222 of the base station reception unit 22 directly multiplexes the electrical signals outputted from each of the antenna devices 221. Since time division multiplexing is implemented in the wireless section, it is not necessary for the multiplexing unit 222 to perform the processing specifically for time division multiplexing. The signal processing control unit 123 of the central station reception unit 12 outputs the signals allocated to each of the time slots to the signal processing units 124 corresponding to the time slots. The information indicating the corresponding relations regarding the time slots and the wireless systems is stored in the setting information storage unit 112 and the setting information storage unit 122.

With such a configuration, it becomes possible to perform wireless communication with a plurality of wireless systems by using the common antenna devices. Therefore, the hardware of the antenna devices in the base station device 2 can be used efficiently, so that it becomes possible to accommodate a still greater number of wireless systems.

Hardware Configuration of First Embodiment

The plurality of signal processing units 111 and the signal processing control unit 113 described above are configured by using a processor such as a CPU (Central Processing Unit) and a memory. Note that a whole part of or a part of each of the functions of the signal processing unit 111 and the signal processing control unit 113 may be implemented by using hardware such as ASIC (Application Specific Integrated Circuit), PLD (Programmable Logic Device), FPGA (Field Programmable Gate Array), or the like. The program may be recorded on a computer readable recording medium. The computer readable recording medium may be a removable medium such as a flexible disk, a magneto-optical disc, a ROM, a CD-ROM, or a semiconductor memory device (for example, SSD: Solid State Drive) or may be a storage device such as a hard disk or a semiconductor memory device built in a computer system. The program may be transmitted via a telecommunications line.

Second Embodiment

Figure 6:
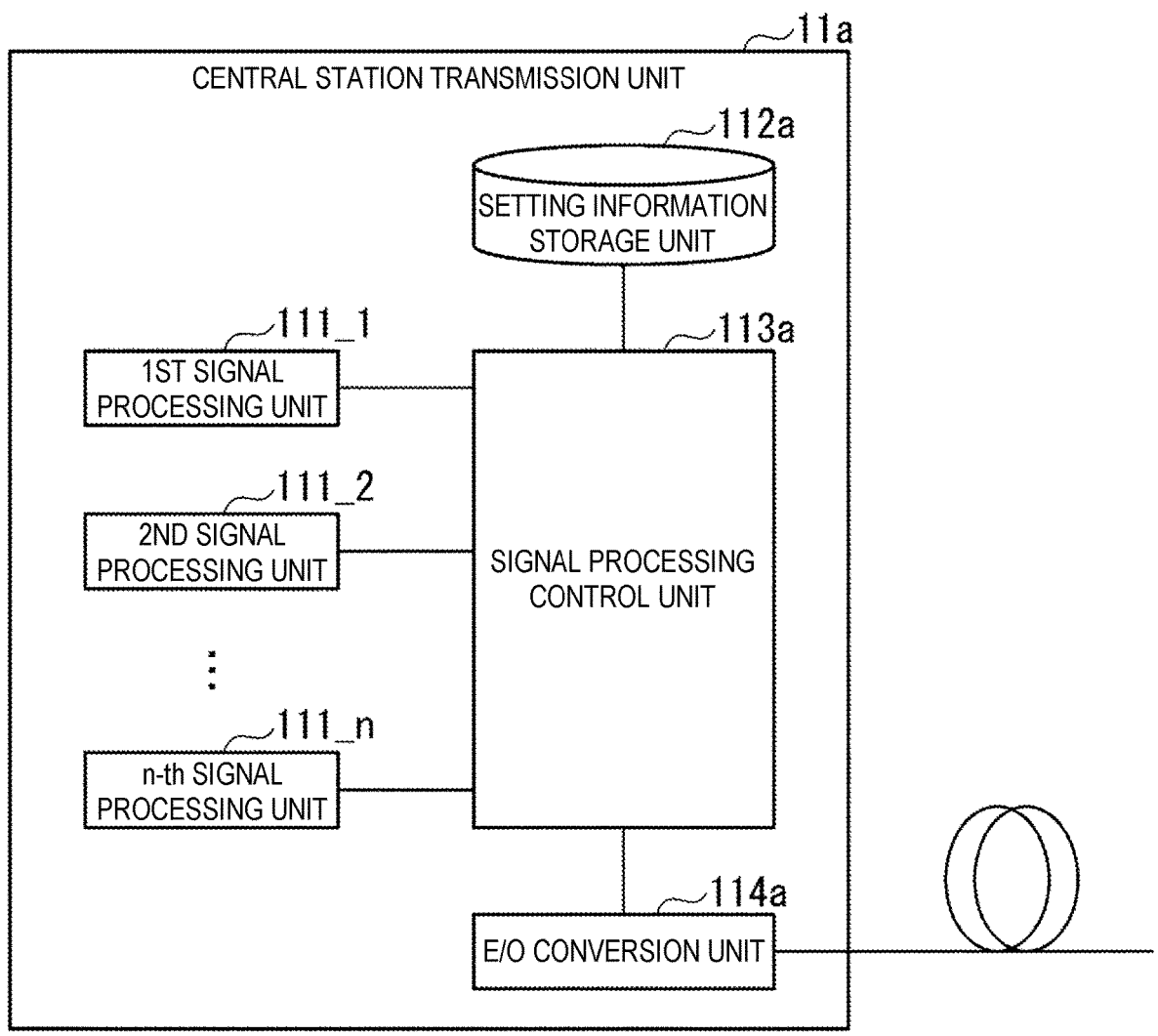
FIG. 6 is a diagram illustrating a functional configuration example of a central station transmission unit 11a according to a second embodiment.

FIG. 6 is a diagram illustrating a functional configuration example of a central station transmission unit 11*a* according to a second embodiment. In the second embodiment, communication is performed by using WDM (Wavelength Division Multiplexing) via the optical transmission path 4. The central station transmission unit 11*a* includes the plurality of signal processing units 111 (111_1 to 111_*n*: 'n' is an integer of 2 or larger), a setting information storage unit 112*a*, a signal processing control unit 113*a*, and the E/O conversion unit 114.

The signal processing unit 111 operates in accordance with the type of wireless system allocated in advance. The configuration of the signal processing unit 111 is the same as that of the first embodiment, so that detailed explanations will be omitted.

The setting information storage unit 112*a* is configured by using a storage device such as a magnetic hard disk device, a semiconductor memory device, or the like. The setting information storage unit 112*a* stores information regarding multiplexing of the electrical signals outputted from each of the signal processing units 111. The setting information storage unit 112*a* may store information indicating wavelengths to which the signals outputted from each of the signal processing units 111 are allocated, for example. The information indicating the wavelength may be a value indicating the identification number of the wavelength or information indicating the length of the wavelength, for example.

The signal processing control unit 113*a* outputs the electrical signals outputted from the plurality of signal processing units 111 to the E/O conversion unit 114. At this time, the signal processing control unit 113*a* outputs each of the electrical signals such that intensity modulation is performed for the optical signals of the wavelengths corresponding to each of the wireless systems.

The E/O conversion unit 114*a* emits light of a plurality of wavelengths. For the light of each of the wavelengths, the E/O conversion unit 114*a* performs intensity modulation on the electrical signal of the wireless system corresponding thereto so as to generate an optical signal of WDM. The E/O conversion unit 114*a* outputs the generated optical signal to the optical transmission path 4.

Figure 7:
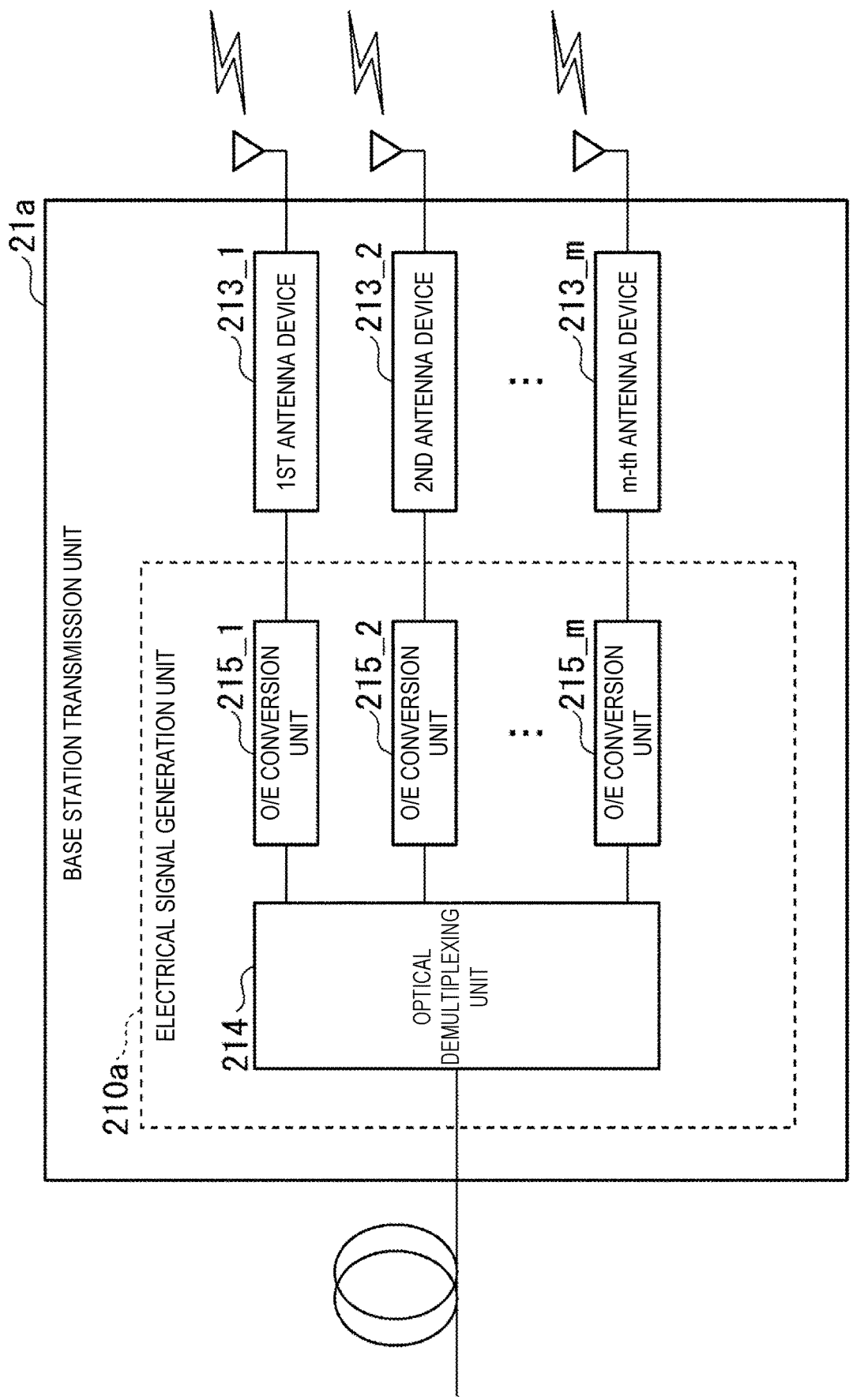
FIG. 7 is a diagram illustrating a functional configuration example of a base station transmission unit 21a according to the second embodiment.

FIG. 7 is a diagram illustrating a functional configuration example of a base station transmission unit 21*a* according to the second embodiment. The base station transmission unit 21*a* according to the second embodiment receives the optical signal multiplexed by WDM from the optical transmission path 4. The base station transmission unit 21*a* includes an electrical signal generation unit 210*a* and the plurality of antenna devices 213 (213_1 to 213_*m*: 'm' is an integer of 2 or larger).

The electrical signal generation unit 210*a* receives the optical signal from the optical transmission path 4, and converts the received optical signal into a plurality of electrical signals. The electrical signal generation unit 210*a* includes an optical demultiplexing unit 214, and a plurality of O/E conversion units 215 (215_1 to 215_*m*).

The optical demultiplexing unit 214 demultiplexes the optical signal received from the optical transmission path 4 according to the wavelengths. The optical demultiplexing unit 214 outputs the demultiplexed optical signals of each of the wavelengths to the O/E conversion units 215 corresponding to the wavelengths.

The O/E conversion unit 215 converts the optical signal outputted from the optical demultiplexing unit 214 into an electrical signal. The O/E conversion unit 215 outputs the converted electrical signal to the antenna device 213 corresponding to itself.

The antenna device 213 may be configured by using an array antenna, for example. The antenna device 213 emits the electrical signal outputted from the O/E conversion unit 215 into the air as the wireless signal.

Figure 8:
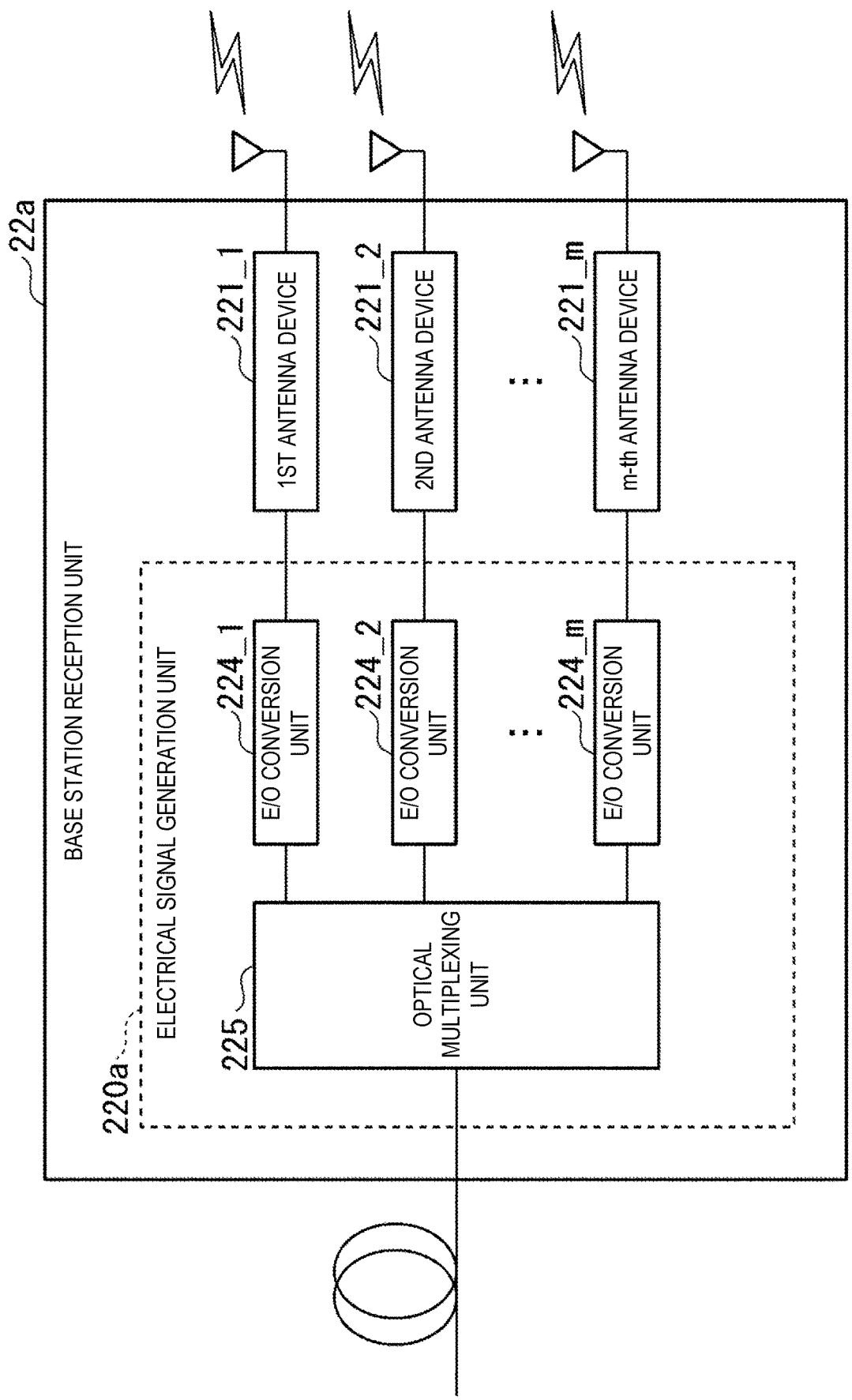
FIG. 8 is a diagram illustrating a functional configuration example of a base station reception unit 22a according to the second embodiment.

FIG. 8 is a diagram illustrating a functional configuration example of a base station reception unit 22*a* according to the second embodiment. The base station reception unit 22*a* according to the second embodiment transmits the optical signal multiplexed by WDM to the optical transmission path 4. The base station reception unit 22*a* includes an optical signal generation unit 220*a* and the plurality of antenna devices 221 (221_1 to 221_*m*: 'm' is an integer of 2 or larger). Note that the number of the antenna devices 213 provided to the base station transmission unit 21*a* and the number of the antenna devices 221 provided to the base station reception unit 22*a* may be the same or different.

The antenna device 221 may be configured by using an array antenna, for example. The configuration of the antenna device 221 is the same as that of the first embodiment, so that detailed explanations will be omitted.

The E/O conversion unit 224 performs intensity modulation on the electrical signal outputted from the antenna device 221 corresponding to itself to generate the optical signal of the wavelength corresponding to itself. The E/O conversion unit 224 outputs the generated optical signal to an optical multiplexing unit 225.

The optical signal generation unit 220*a* generates optical signals to be transmitted to the central station device 1 based on the electrical signals outputted from the plurality of antenna devices 221. The optical signal generation unit 220*a* includes a plurality of E/O conversion units 224 (224_1 to 224_*m*) and the optical multiplexing unit 225.

The optical multiplexing unit 225 generates an optical signal of WDM by multiplexing the optical signals of each of the wavelengths outputted from the E/O conversion units 224. The optical multiplexing unit 225 outputs the generated optical signal to the optical transmission path 4.

Figure 9:
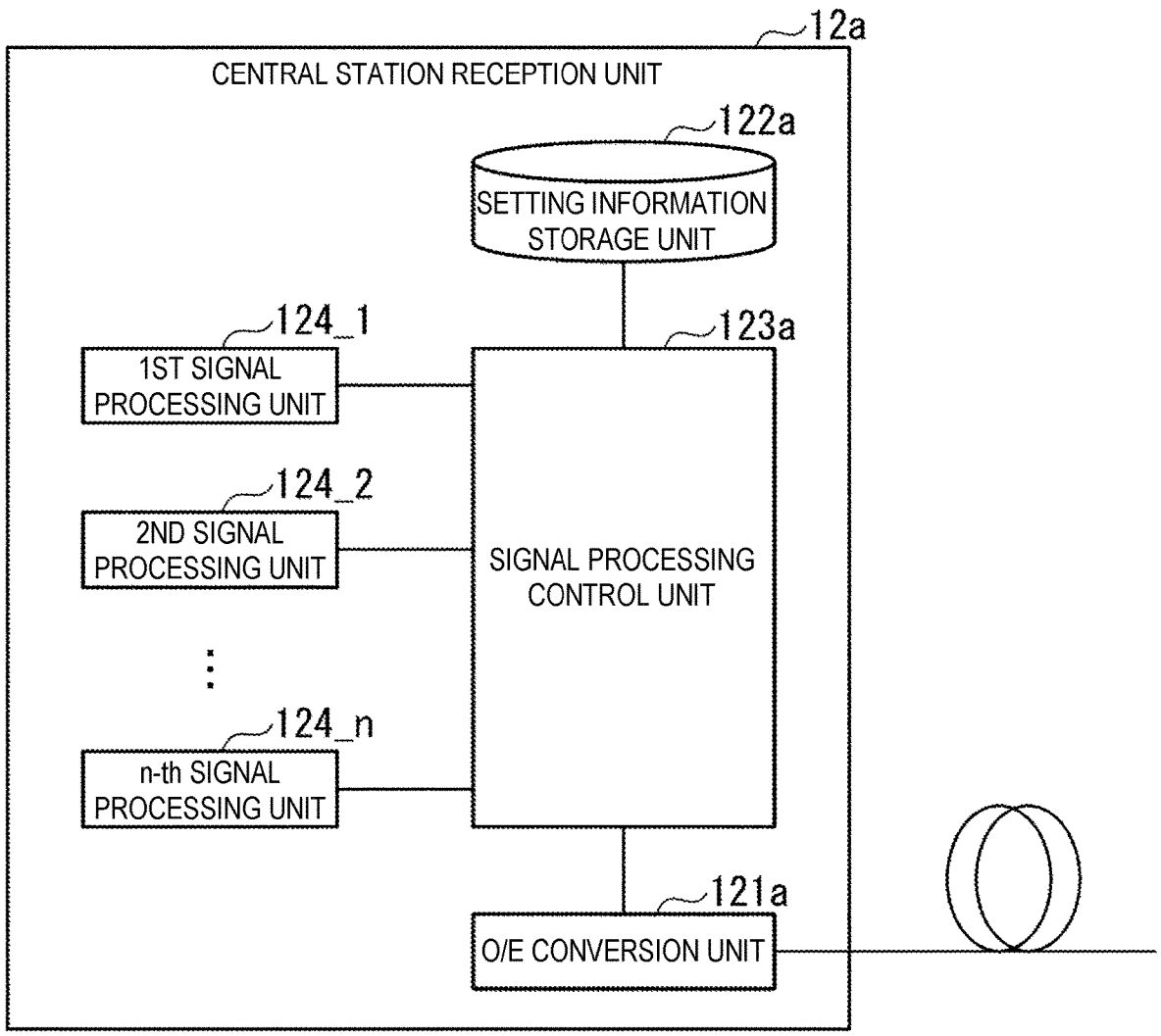
FIG. 9 is a diagram illustrating a functional configuration example of a central station reception unit 12a according to the second embodiment.

FIG. 9 is a diagram illustrating a functional configuration example of the central station reception unit 12a according to the second embodiment. The central station reception unit 12a according to the second embodiment receives the optical signal multiplexed by WDM from the optical transmission path. The central station reception unit 12a includes an O/E conversion unit 121a, a setting information storage unit 122a, a signal processing control unit 123a, and the plurality of signal processing units 124 (124_1 to 124_n). Note that the number of the signal processing units 111 provided to the central station transmission unit 11a and the number of the signal processing units 124 provided to the central station reception unit 12a may be the same or different.

The O/E conversion unit 121a generates electrical signals different for each of the wavelengths by demodulating the optical signals of each of the wavelengths received from the optical transmission path 4. The O/E conversion unit 121a outputs each of the generated electrical signals to the signal processing control unit 123a.

The setting information storage unit 122a is configured by using a storage device such as a magnetic hard disk device, a semiconductor memory device, or the like. The setting information storage unit 122a stores information indicating the corresponding relations regarding the wavelengths of the optical signals and the plurality of signal processing units 124. The setting information storage unit 122a may store the information indicating the relations regarding the electrical signals outputted to each of the signal processing units 124 and the optical wavelengths to which the electrical signals are allocated, for example.

The signal processing control unit 123a outputs each of the electrical signals outputted from the O/E conversion unit 121a to each of the signal processing units 124 based on the information stored in the setting information storage unit 122a. That is, the signal processing control unit 123a outputs the electrical signals demodulated from the optical signals of the corresponding wavelengths to the signal processing units 124 corresponding to each of the wavelengths of the WDM signals received at the O/E conversion unit 121a.

The signal processing unit 124 operates in accordance with the type of wireless system allocated in advance. The configuration of the signal processing unit 124 is the same as that of the second embodiment, so that detailed explanations will be omitted.

In regards to the technique for transmitting high frequency band signals via the optical fibers, the second embodiment configured as described above makes it possible to integrate and accommodate the wireless systems more flexibly. Specifically, it is described as follows. In the second embodiment, the plurality of signal processing units 111 corresponding to the wireless systems are provided in the central station transmission unit 11a. The electrical signals generated in each of the signal processing units 111 are wavelength-multiplexed by the signal processing control unit 123 and transmitted to the base station transmission unit 21a via the optical transmission path 4. Then, the electrical signals corresponding to each of the wireless systems are transmitted as the wireless signals from the antenna devices 213 corresponding to the frequencies used for each of the wireless systems. Therefore, unlike the conventional technique (technique disclosed in Non-Patent Literature 2, for example) with which only prescribed wireless systems defined in advance can be accommodated, it becomes possible to accommodate arbitrary various types of wireless systems. This is also the same for uplink signals.

Furthermore, in the second embodiment, it is possible to accommodate a new wireless system or to unassign the already accommodated wireless system by rewriting the information stored in the setting information storage unit 112a. As described, with the second embodiment, flexibility for the wireless systems to be accommodated can be improved. This is also the same for uplink signals.

Furthermore, with the second embodiment, a new antenna device can be placed in the base station device 2 by rewriting the information stored in the setting information storage unit 112a. As described, with the second embodiment, flexibility for the wireless systems to be accommodated can be improved. This is also the same for uplink signals.

Modification Example of Second Embodiment

In a case where the frequency band of the wireless signals used in a plurality of wireless systems is the same, the plurality of wireless systems may be configured to share a single antenna device 213 and antenna device 221. In this case, wireless communication between the terminal device 3 and the base station device 2 in the plurality of wireless systems using the common antenna devices may be performed by time division multiplexing, for example. Note that the signals of the wireless systems that use different antenna devices may be multiplexed by wavelength division multiplexing as described above.

For example, in a case where time division multiplexing is applied, a specific time slot is allocated to each of the plurality of wireless systems using the same antenna devices. The signal processing control unit 113a of the central station transmission unit 11a allocates the electrical signal outputted from each of the signal processing units 111 to the time slot that is allocated to the wireless system of the corresponding signal processing unit 111. The base station transmission unit 21a transmits the signals of each of the frequency bands received via the optical transmission path 4 from the antenna device 213, so that time division multiplexing can be implemented in a wireless section.

The optical multiplexing unit 225 of the base station reception unit 22a performs intensity modulation on the optical signals outputted from each of the E/O conversion units 224 into the light of the wavelengths corresponding to each of the E/O conversion units 224 to implement multiplexing. Since time division multiplexing is implemented in the wireless section, it is not necessary for the optical multiplexing unit 225 to perform the processing specifically for time division multiplexing. The signal processing control unit 123a of the central station reception unit 12a outputs the signals allocated to each of the time slots to the signal processing units 124 corresponding to the time slots. The information indicating the corresponding relations regarding the time slots and the wireless systems is stored in the setting information storage unit 112a and the setting information storage unit 122a.

With such a configuration, it becomes also possible with the second embodiment to perform wireless communication with a plurality of wireless systems by using the common antenna devices. Therefore, the hardware of the antenna devices in the base station device 2 can be used efficiently, so that it becomes possible to accommodate a still greater number of wireless systems.

Hardware Configuration of Second Embodiment

The plurality of signal processing units 111a and the signal processing control unit 113a described above are configured by using a processor such as a CPU and a memory. Note that a whole part of or a part of each of the functions of the signal processing unit 111a and the signal processing control unit 113a may be implemented by using hardware such as ASIC, PLD, FPGA, or the like. The program may be recorded on a computer readable recording medium. The computer readable recording medium may be a removable medium such as a flexible disk, a magneto-optical disc, a ROM, a CD-ROM, or a semiconductor memory device (SSD, for example) or may be a storage device such as a hard disk or a semiconductor memory device built in a computer system. The program may be transmitted via a telecommunications line.

Third Embodiment

Figure 10:
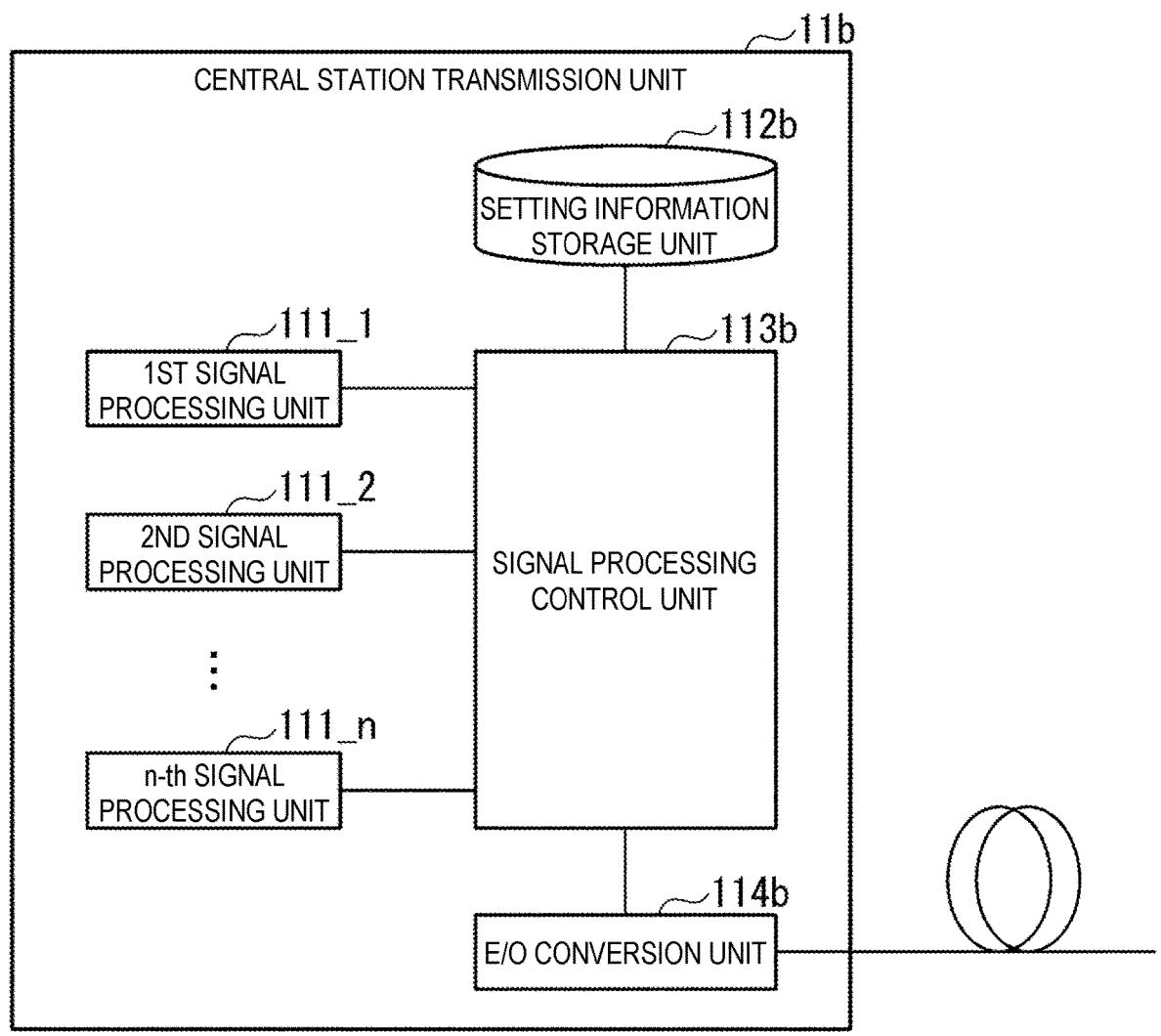
FIG. 10 is a diagram illustrating a functional configuration example of a central station transmission unit 11b according to a third embodiment.

FIG. 10 is a diagram illustrating a functional configuration example of a central station transmission unit 11b according to a third embodiment. In the third embodiment, communication is performed by using SCM and WDM via the optical transmission path 4. The central station transmission unit 11b includes the plurality of signal processing units 111 (111_1 to 111_n: 'n' is an integer of 2 or larger), a setting information storage unit 112b, a signal processing control unit 113b, and the E/O conversion unit 114.

The signal processing unit 111 operates in accordance with the type of wireless system allocated in advance. The configuration of the signal processing unit 111 is the same as that of the first embodiment, so that detailed explanations will be omitted.

The setting information storage unit 112b is configured by using a storage device such as a magnetic hard disk device, a semiconductor memory device, or the like. The setting information storage unit 112b stores information regarding multiplexing of the electrical signals outputted from each of the signal processing units 111. The setting information storage unit 112b may store information indicating subcarriers and wavelengths to which the signals outputted from each of the signal processing units 111 are allocated, for example.

The signal processing control unit 113b outputs the electrical signals outputted from the plurality of signal processing units 111 to the E/O conversion unit 114. At this time, the signal processing control unit 113b generates a plurality of multiplex signals by multiplexing the electrical signals outputted from the plurality of signal processing units 111 by frequency division multiplexing. Furthermore, the signal processing control unit 113b outputs each of the multiplex signals such that intensity modulation is performed for the optical signals of the wavelengths corresponding to the wireless systems of the signals included in each of the multiplex signals.

The E/O conversion unit 114b emits light of a plurality of wavelengths. For the light of each of the wavelengths, the E/O conversion unit 114b performs intensity modulation on the electrical signals of the multiplex signals including the corresponding wireless systems to generate the optical signals that are the SCM signals multiplexed by WDM. The E/O conversion unit 114b outputs the generated optical signals to the optical transmission path 4.

Figure 11:
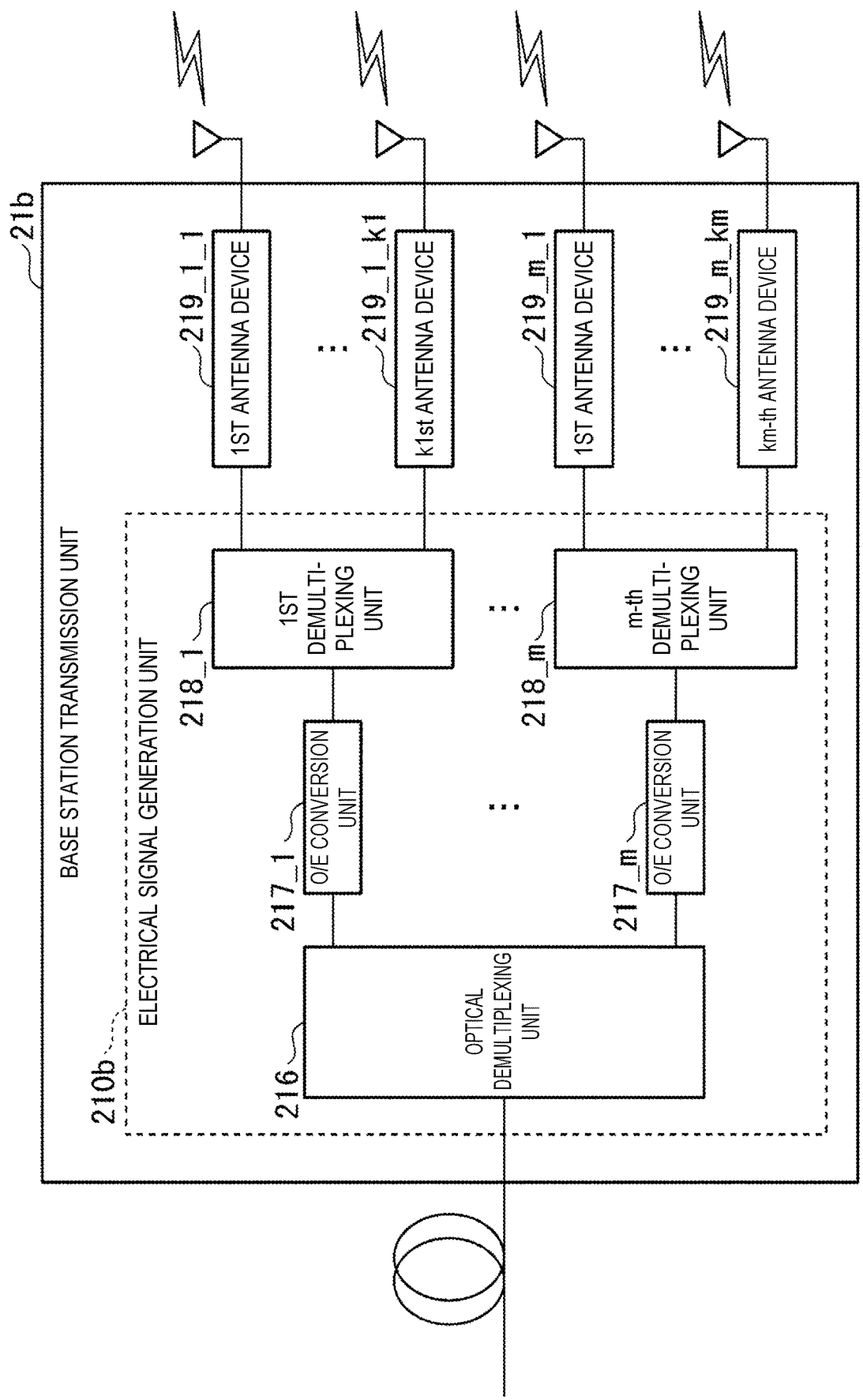
FIG. 11 is a diagram illustrating a functional configuration example of a base station transmission unit 21b according to the third embodiment.

FIG. 11 is a diagram illustrating a functional configuration example of a base station transmission unit 21b according to the third embodiment. The base station transmission unit 21b according to the third embodiment receives the optical signals multiplexed by SCM and WDM from the optical transmission path 4. The base station transmission unit 21b includes an electrical signal generation unit 210b and a plurality of antenna devices 219 (219_1_1 to 219_m_km: 'k1' to 'km' are integers of 2 or larger).

The electrical signal generation unit 210b receives the optical signal from the optical transmission path 4, and converts the received optical signal to a plurality of electrical signals. The electrical signal generation unit 210b includes an optical demultiplexing unit 216, a plurality of O/E conversion units 217 (217_1 to 217_m), and a plurality of demultiplexing units 218 (218_1 to 218_m).

The optical demultiplexing unit 216 demultiplexes the optical signal received from the optical transmission path 4 according to the wavelengths. The optical demultiplexing unit 216 outputs the demultiplexed optical signals of each of the wavelengths to the O/E conversion units 217 corresponding to the wavelengths.

The O/E conversion unit 217 converts the optical signal outputted from the optical demultiplexing unit 216 into the electrical signal. The O/E conversion unit 217 outputs the converted electrical signal to the demultiplexing unit 218 corresponding to itself.

The demultiplexing unit 218 demultiplexes the electrical signal outputted from the O/E conversion unit 217 for the plurality of antenna devices 219. The demultiplexing unit 218 outputs the signals of each of the frequencies multiplexed by FDM, for example, to the antenna devices 219 set in advance according the frequencies thereof. The demultiplexing unit 218 may be configured to be able to change the corresponding relations of the frequencies and the antenna devices 219.

The antenna device 219 may be configured by using an array antenna, for example. The antenna device 219 emits the electrical signal outputted from the demultiplexing unit 218 into the air as the wireless signal. The number of antenna devices (k1, k2, . . . , km) connected to a single demultiplexing unit 218 may be different or the same from each other.

Figure 12:
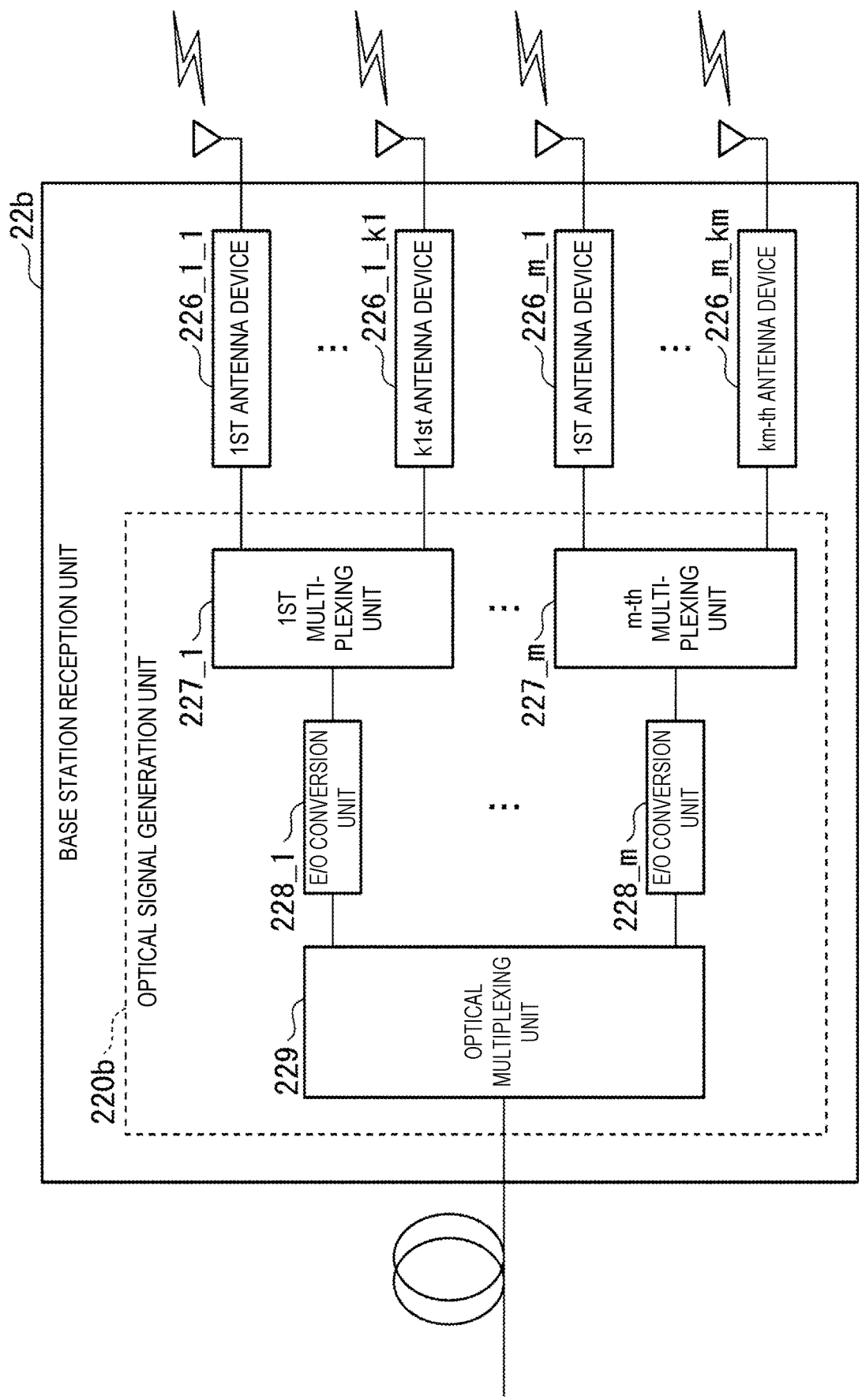
FIG. 12 is a diagram illustrating a functional configuration example of a base station reception unit 22b according to the third embodiment.

FIG. 12 is a diagram illustrating a functional configuration example of a base station reception unit 22b according to the third embodiment. The base station reception unit 22b according to the third embodiment transmits the optical signals multiplexed by SCM and WDM to the optical transmission path 4. The base station reception unit 22b includes an optical signal generation unit 220b and a plurality of antenna devices 226 (226_1 to 226_km: 'k1' to 'km' are integers of 2 or larger). Note that the number of the antenna devices 219 provided to the base station transmission unit 21b and the number of the antenna devices 226 provided to the base station reception unit 22b may be the same or different.

The antenna device 226 may be configured by using an array antenna, for example. The configuration of the antenna device 226 is the same as that of the first embodiment, so that detailed explanations will be omitted. Note that the number of antenna devices (k1, k2, . . . , km) connected to a single multiplexing unit 227 may be different or the same from each other.

The optical signal generation unit 220b generates optical signals to be transmitted to the central station device 1 based on the electrical signals outputted from the plurality of antenna devices 226. The optical signal generation unit 220b includes a plurality of the multiplexing units 227 (227_1 to 227_m), a plurality of E/O conversion units 228 (228_1 to 228_m), and an optical multiplexing unit 229.

The multiplexing unit 227 generates a multiplex signal by multiplexing each of the electrical signals outputted from the plurality of antenna devices 226 by frequency division multiplexing (FDM). When the frequencies that can be received by each of the antenna devices 226 are different, the multiplexing unit 227 can generate a multiplex signal by simply adding each of the electrical signals. The multiplexing unit 227 outputs the generated multiplex signal to the E/O conversion unit 228 corresponding to itself.

The E/O conversion unit 228 performs intensity modulation on the electrical signal outputted from the multiplexing unit 227 corresponding to itself to generate the optical signal of the wavelength corresponding to itself. The E/O conversion unit 228 outputs the generated optical signal to the optical multiplexing unit 229.

The optical multiplexing unit 229 multiplexes the optical signals of each of the wavelengths outputted from the E/O conversion units 228 to generate the optical signal of SCM and WDM. The optical multiplexing unit 229 outputs the generated optical signal to the optical transmission path 4.

Figure 13:
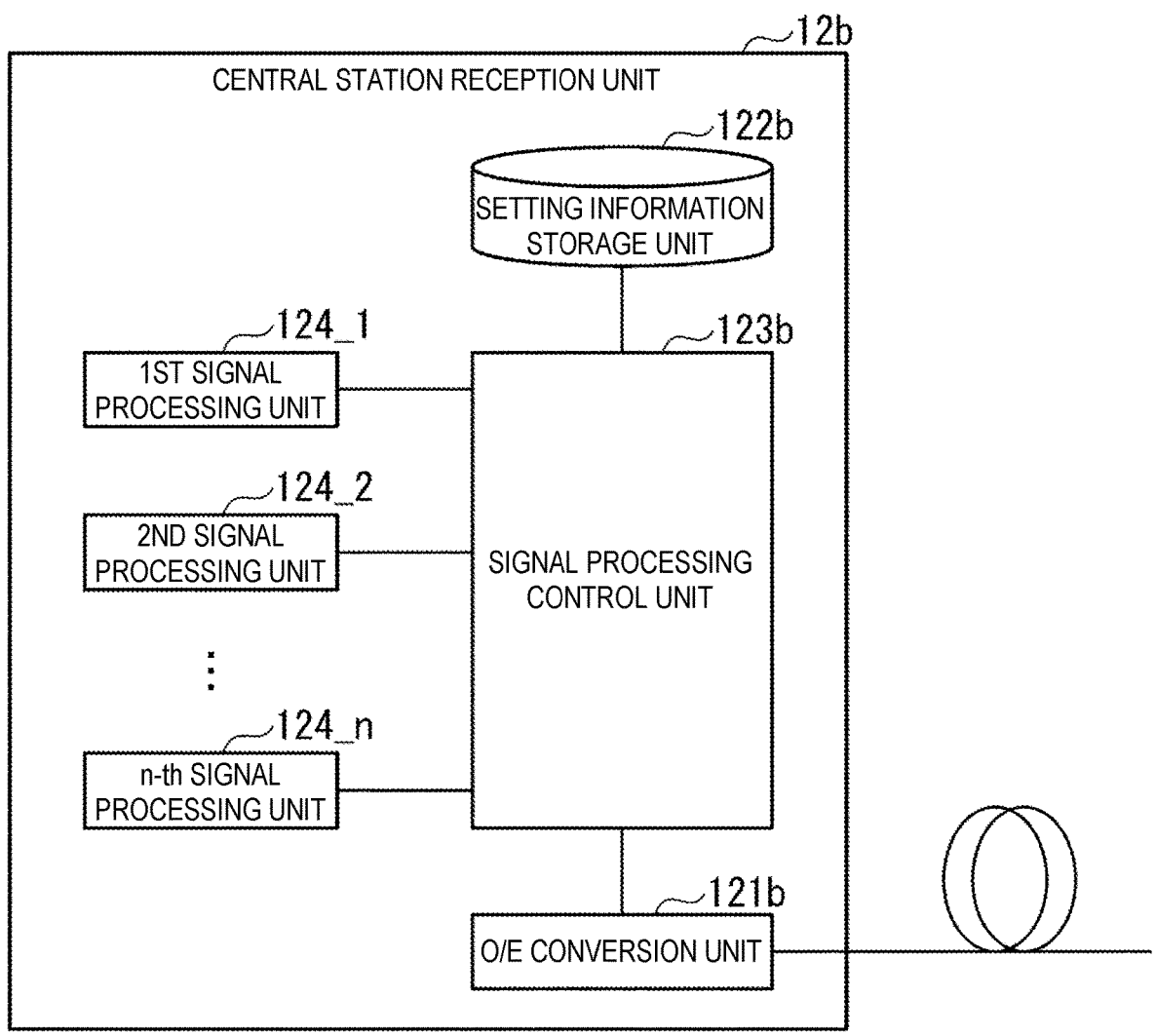
FIG. 13 is a diagram illustrating a functional configuration example of a central station reception unit 12b according to the third embodiment.

FIG. 13 is a diagram illustrating a functional configuration example of the central station reception unit 12b according to the third embodiment. The central station reception unit 12b according to the third embodiment receives the optical signal multiplexed by SCM and WDM from the optical transmission path 4. The central station reception unit 12b includes an O/E conversion unit 121b, a setting information storage unit 122b, a signal processing control unit 123b, and the plurality of signal processing units 124 (124_1 to 124_n). Note that the number of the signal processing units 111 provided to the central station transmission unit 11b and the number of the signal processing units 124 provided to the central station reception unit 12b may be the same or different.

The O/E conversion unit 121b generates multiplex signals (electrical signals) of frequency division multiplexing different for each of the wavelengths by demodulating the optical signals of each of the wavelengths received from the optical transmission path 4. The O/E conversion unit 121b outputs each of the generated electrical signals to the signal processing control unit 123b.

The setting information storage unit 122b is configured by using a storage device such as a magnetic hard disk device, a semiconductor memory device, or the like. The setting information storage unit 122b stores information indicating the corresponding relations regarding the subcarriers of the optical signals, the wavelengths of the optical signals, and the plurality of signal processing units 124. The setting information storage unit 122b may store the information indicating the relations regarding the electrical signals outputted for each of the signal processing units 124 and the subcarriers as well as the optical wavelengths to which the electrical signals are allocated, for example.

The signal processing control unit 123b outputs each of the electrical signals outputted from the O/E conversion unit 121b to each of the signal processing units 124 based on the information stored in the setting information storage unit 122b. That is, the signal processing control unit 123b outputs the electrical signals demodulated from the optical signal of the corresponding subcarrier and wavelength to the signal processing unit 124 corresponding to a combination of the subcarrier and the wavelength of the SCM/WDM signal received at the O/E conversion unit 121b.

The signal processing unit 124 operates in accordance with the type of wireless system allocated in advance. The configuration of the signal processing unit 124 is the same as that of the third embodiment, so that detailed explanations will be omitted.

In regards to the technique for transmitting high frequency band signals via the optical fibers, the third embodiment configured as described above makes it possible to integrate and accommodate the wireless systems more flexibly. Specifically, it is described as follows. In the third embodiment, the plurality of signal processing units 111 corresponding to the wireless systems are provided in the central station transmission unit 11b. The electrical signals generated in each of the signal processing units 111 are subcarrier-multiplexed and wavelength-multiplexed by the signal processing control unit 123b and transmitted to the base station transmission unit 21b via the optical transmission path 4. Then, the electrical signals corresponding to each of the wireless systems are transmitted as the wireless signals from the antenna devices 219 corresponding to the frequencies used for each of the wireless systems. Therefore, unlike the conventional technique (technique disclosed in Non-Patent Literature 2, for example) with which only prescribed wireless systems defined in advance can be accommodated, it becomes possible with the third embodiment to accommodate arbitrary various types of wireless systems. This is also the same for uplink signals.

Furthermore, in the third embodiment, it is possible to accommodate a new wireless system or to unassign the already accommodated wireless system by rewriting the information stored in the setting information storage unit 112b. As described, with the third embodiment, flexibility for the wireless systems to be accommodated can be improved. This is also the same for uplink signals.

Furthermore, with the third embodiment, a new antenna device can be placed in the base station device 2 by rewriting the information stored in the setting information storage unit 112b. As described, with the third embodiment, flexibility for the wireless systems to be accommodated can be improved. This is also the same for uplink signals.

Furthermore, with the third embodiment, it is possible to provide a still greater number of antenna devices in the base station device 2 and to accommodate a still greater number of wireless systems. This makes it possible to flexibly accommodate newly born wireless systems as well.

Modification Example of Third Embodiment

In a case where the frequency band of the wireless signals used in a plurality of wireless systems is the same, the plurality of wireless systems may be configured to share a single common antenna device 219 and antenna device 226. In this case, wireless communication between the terminal device 3 and the base station device 2 in the plurality of wireless systems using the common antenna devices may be performed by time division multiplexing, for example. Note that the signals of the wireless systems that use different antenna devices may be multiplexed by wavelength division multiplexing as described above.

For example, in a case where time division multiplexing is applied, a specific time slot is allocated to each of the plurality of wireless systems using the same antenna devices. The signal processing control unit 113b of the central station transmission unit 11b allocates the electrical signal outputted from each of the signal processing units 111 to the time slot that is allocated to the wireless system of the corresponding signal processing unit 111. The base station transmission unit 21b transmits the signals of each of the frequency bands received via the optical transmission path 4 from the antenna device 213, so that time division multiplexing can be implemented in a wireless section.

The optical multiplexing unit 229 of the base station reception unit 22b generates, from the optical signals outputted from each of the E/O conversion units 228, the optical signals of SCM and WDM corresponding to each of the E/O conversion units 228. Since time division multiplexing is implemented in the wireless section, it is not necessary for the optical multiplexing unit 229 to perform the processing specifically for time division multiplexing. The signal processing control unit 123b of the central station reception unit 12b outputs the signals allocated to each of the time slots to the signal processing units 124 corresponding to the time slots. The information indicating the corresponding relations regarding the time slots and the wireless systems is stored in the setting information storage unit 112b and the setting information storage unit 122b.

With such a configuration, it becomes also possible with the third embodiment to perform wireless communication with a plurality of wireless systems by using the common antenna devices. Therefore, the hardware of the antenna devices in the base station device 2 can be used efficiently, so that it becomes possible to accommodate a still greater number of wireless systems.

Hardware Configuration of Third Embodiment

The plurality of signal processing units 111b and the signal processing control unit 113b described above are configured by using a processor such as a CPU and a memory. Note that a whole part of or a part of each of the functions of the signal processing unit 111b and the signal processing control unit 113b may be implemented by using hardware such as ASIC, PLD, FPGA, or the like. The program may be recorded on a computer readable recording medium. The computer readable recording medium may be a removable medium such as a flexible disk, a magneto-optical disc, a ROM, a CD-ROM, or a semiconductor memory device (SSD, for example) or may be a storage device such as a hard disk or a semiconductor memory device built in a computer system. The program may be transmitted via a telecommunications line.

In the embodiments described above, in a case where a plurality of wireless systems share a single antenna device, multiplexing can be performed by TDM or FDM. By expanding the above-described configuration (especially in a case of WDM) and performing multiplexing by space division multiplexing (SDM), it becomes possible to share a single antenna device with a plurality of wireless systems. Hereinafter, fourth to seventh embodiments will be described as specific examples of the embodiment using SDM.

Fourth Embodiment

Figure 14:
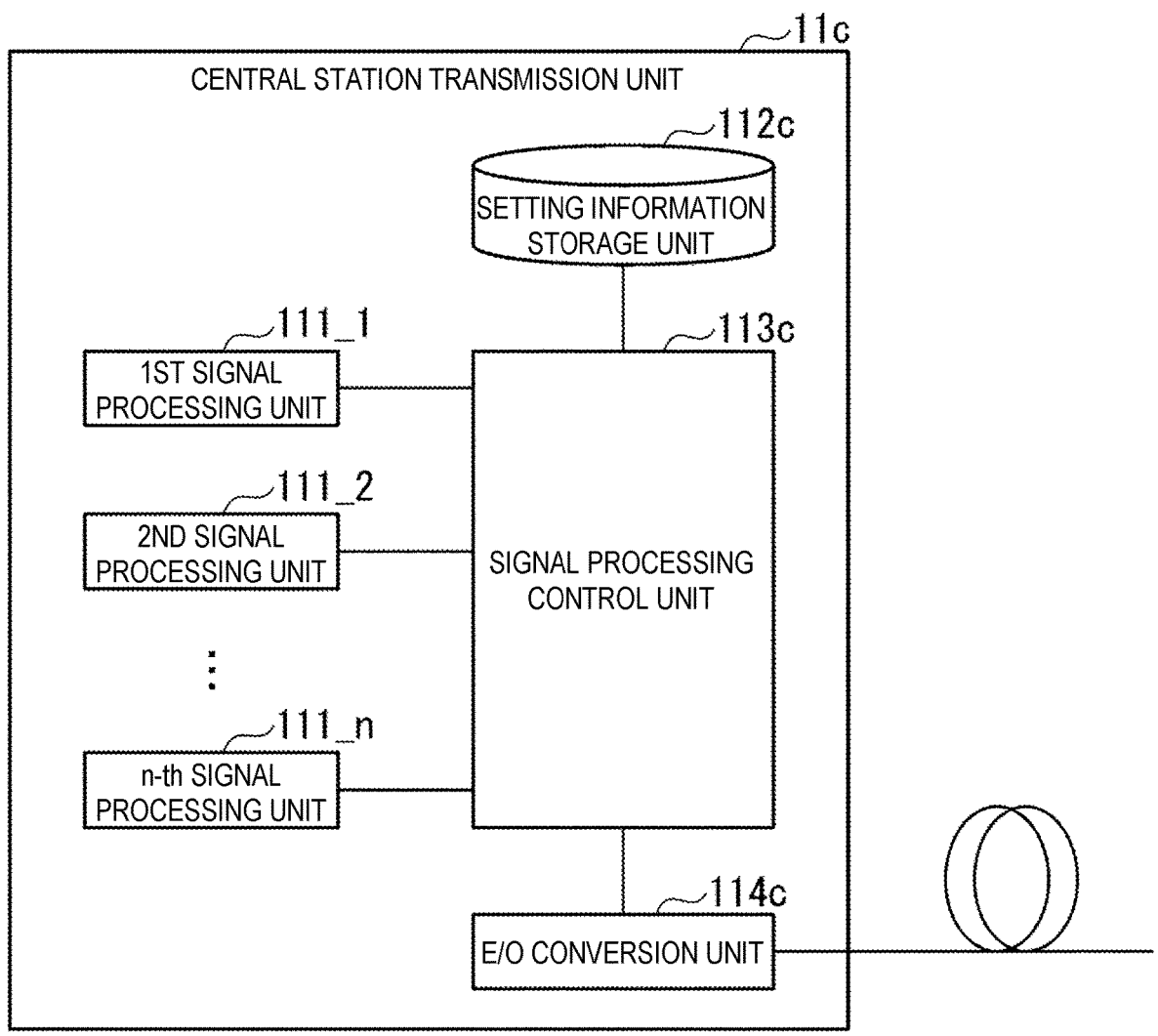
FIG. 14 is a diagram illustrating a functional configuration example of a central station transmission unit 11c according to a fourth embodiment.

FIG. 14 is a diagram illustrating a functional configuration example of a central station transmission unit 11c according to the fourth embodiment. In the fourth embodiment, a single antenna in the base station device 2 is shared with a plurality of wireless systems. The central station transmission unit 11c includes the plurality of signal processing units 111 (111_1 to 111_n: 'n' is an integer of 2 or larger), a setting information storage unit 112c, a signal processing control unit 113c, and an E/O conversion unit 114c. In the fourth embodiment, signals are multiplexing-transmitted by WDM via the optical transmission path 4 between the central station device 1 and the base station device 2, and signals are multiplexing-transmitted by SDM between the base station device 2 and the terminal device 3. For WDM, used are the number of wavelengths equal to or more than the total of the number of the wireless systems sharing a single antenna and the number of control signals to be generated. For SDM, an array antenna is used. The above-described control signal indicate the content of the phase control of each phase shifter in the array antenna.

The signal processing unit 111 operates in accordance with the type of wireless system allocated in advance. The configuration of the signal processing unit 111 is the same as that of the first embodiment, so that detailed explanations will be omitted.

The setting information storage unit 112c is configured by using a storage device such as a magnetic hard disk device, a semiconductor memory device, or the like. The setting information storage unit 112c stores information regarding multiplexing of the electrical signals outputted from each of the signal processing units 111. The setting information storage unit 112c may store information indicating wavelengths to which the signals outputted from each of the signal processing units 111 are allocated, for example.

The signal processing control unit 113c outputs the electrical signals outputted from the plurality of signal processing units 111 to the E/O conversion unit 114c. Furthermore, the signal processing control unit 113c integrates the electrical signals corresponding to the control signals among the electrical signals outputted from the plurality of the signal processing units 111 into the number (one, for example) that is less than the number of the wireless systems. The signal processing control unit 113c outputs the integrated signal (control signal) to the E/O conversion unit 114c. Furthermore, the signal processing control unit 113c outputs each of the electrical signals such that intensity modulation is performed for the optical signals of the wavelengths corresponding to the wireless systems of each of the electrical signals. Moreover, the signal processing control unit 113c outputs the electrical signal corresponding to the control signal such that intensity modulation is performed for the optical signal of another wavelength different from the wavelengths corresponding to the wireless systems.

The E/O conversion unit 114c emits light of a plurality of wavelengths. For the light of each of the wavelengths, the E/O conversion unit 114c performs intensity modulation on the electrical signal of the wireless system corresponding thereto or on the electrical signal of the control signal to generate a WDM signal (an optical signal). The E/O conversion unit 114c outputs the generated optical signal to the optical transmission path 4.

Figure 15:
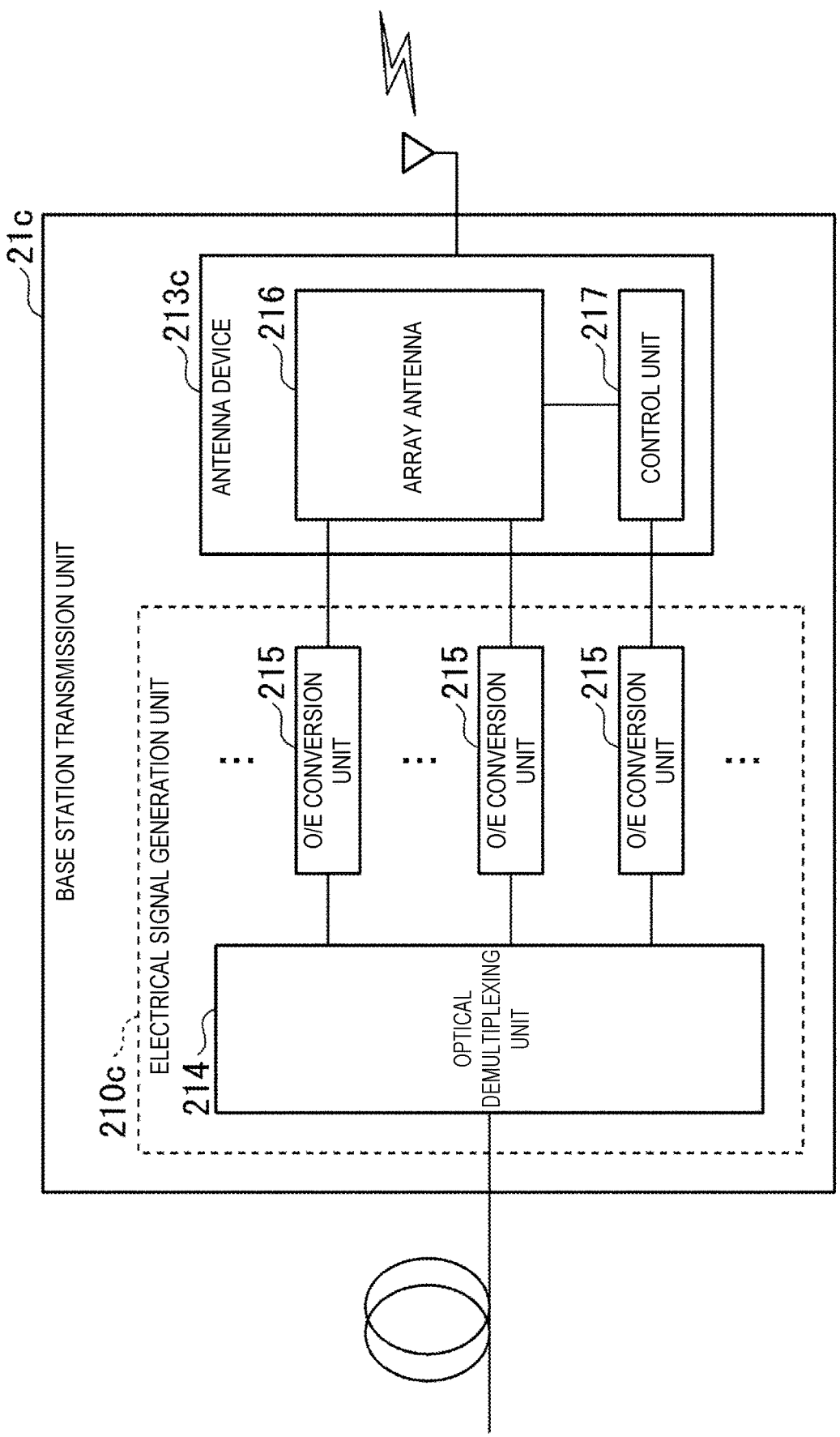
FIG. 15 is a diagram illustrating a functional configuration example of a base station transmission unit 21c according to the fourth embodiment.

FIG. 15 is a diagram illustrating a functional configuration example of a base station transmission unit 21c according to the fourth embodiment. The base station transmission unit 21c according to the fourth embodiment receives the optical signal multiplexed by WDM from the optical transmission path 4. The base station transmission unit 21c includes an electrical signal generation unit 210c and at least one antenna device 213c.

The electrical signal generation unit 210c receives the optical signal from the optical transmission path 4, and converts the received optical signal into a plurality of electrical signals. The electrical signal generation unit 210c includes an optical demultiplexing unit 214 and a plurality of O/E conversion units 215.

The optical demultiplexing unit 214 demultiplexes the optical signal received from the optical transmission path 4 according to the wavelengths. The optical demultiplexing unit 214 outputs the demultiplexed optical signals of each of the wavelengths to the O/E conversion units 215 corresponding to the wavelengths.

The O/E conversion unit 215 converts the optical signal outputted from the optical demultiplexing unit 214 into the electrical signal. The O/E conversion unit 215 outputs the converted electrical signal to the antenna device 213c corresponding to itself. The plurality of O/E conversion units 215 are connected to a single common antenna device 213c. Note that while only a single antenna device 213c is illustrated in FIG. 15, a single base station transmission unit 21c may include a plurality of antenna devices 213c.

The antenna device 213c includes an array antenna 216 and a control unit 217. The plurality of O/E conversion units 215 are connected to the array antenna 216. The antenna device 213c emits the electrical signal outputted from the O/E conversion unit 215 into the air as the wireless signal.

Figure 16:
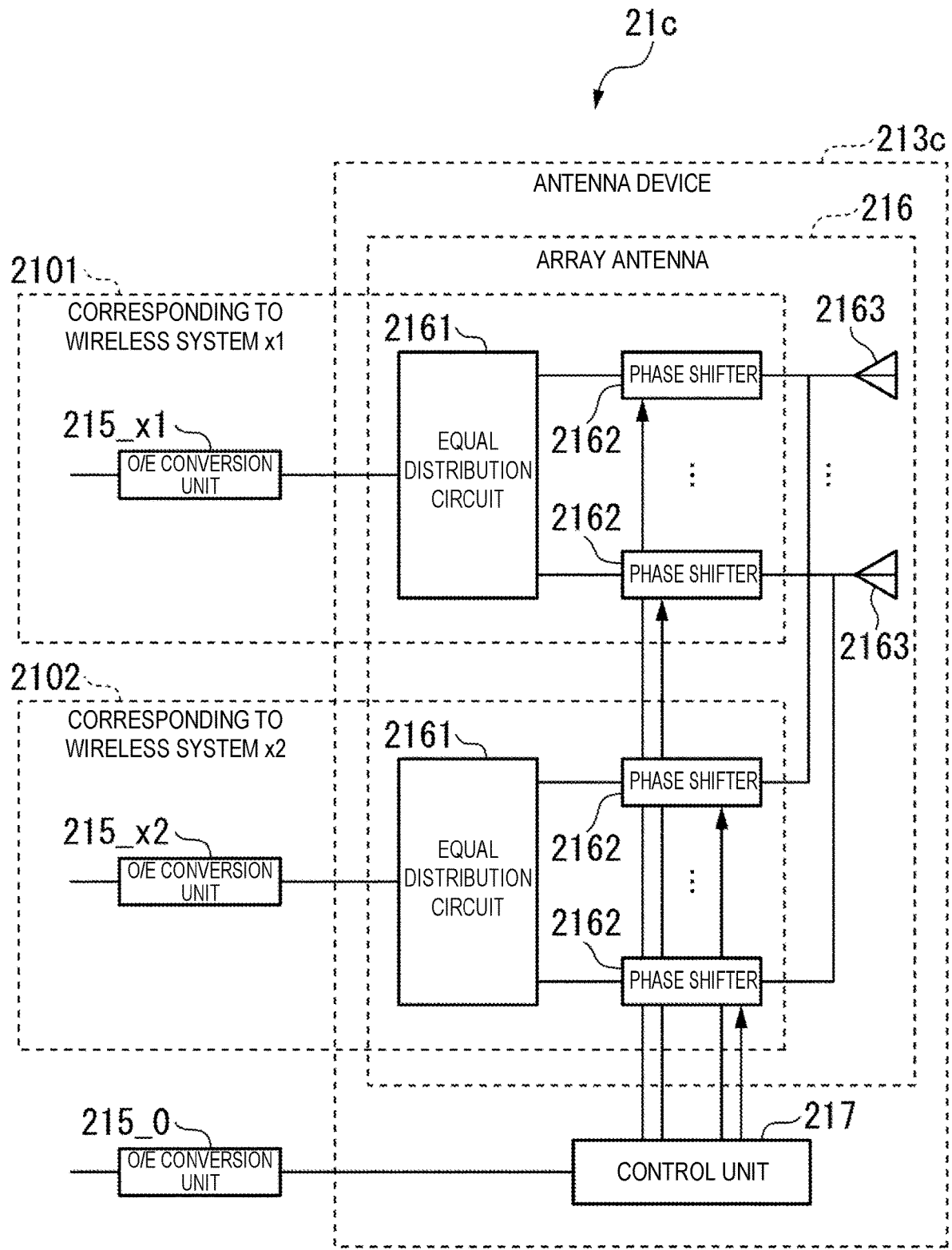
FIG. 16 is a diagram illustrating a specific example of a configuration of an antenna device 213c according to the fourth embodiment.

FIG. 16 is a diagram illustrating a specific example of a configuration of the antenna device 213c according to the fourth embodiment. The array antenna 216 of the antenna device 213c includes a plurality of equal distribution circuits 2161, a plurality of phase shifters 2162, and a plurality of antenna elements 2163. For example, the number of equal distribution circuits 2161 fewer by one than the number of the O/E conversion units 215 connected to the antenna device 213c may be provided to the antenna device 213c. In this case, a single equal distribution circuit 2161 is connected to each of the O/E conversion units 215, and the control unit 217 is connected to the remaining O/E conversion unit 215.

The plurality of phase shifters 2162 are connected to each of the equal distribution circuits 2161. Operations of each of the phase shifters 2162 are controlled by the control unit 217. Each of the phase shifters 2162 is connected to the corresponding antenna element 2163. The antenna element 2163 radiates, into the air, the electromagnetic waves corresponding to the electrical signals outputted from the plurality of phase shifters 2162.

For example, an O/E conversion unit 215_x1 corresponding to a wireless system x1 outputs an electrical signal to the equal distribution circuit 2161 corresponding to the wireless system x1. The equal distribution circuit 2161 distributes the electrical signal to a plurality of the phase shifters 2162 connected to itself. Each of the phase shifters 2162 performs phase control of each of the electrical signals according to the control of the control unit 217. Each of the phase shifters 2162 outputs the phase-controlled electrical signal to the antenna element 2163. The plurality of antenna elements 2163 disposed in an array radiates the electromagnetic wave corresponding to the electrical signal acquired by adding the electrical signals outputted from each of the phase shifters 2162.

The control unit 217 acquires the electrical signal (control signal) outputted from the O/E conversion unit 215_0. The control unit 217 outputs the control signal for each of the phase shifters 2162 according to the control signal. Each of the control signals include a signal indicating the content of phase control performed in each of the phase shifters 2162.

Through the operations described above, space division multiplexing (SDM) is implemented in the fourth embodiment.

Fifth Embodiment

Figure 17:
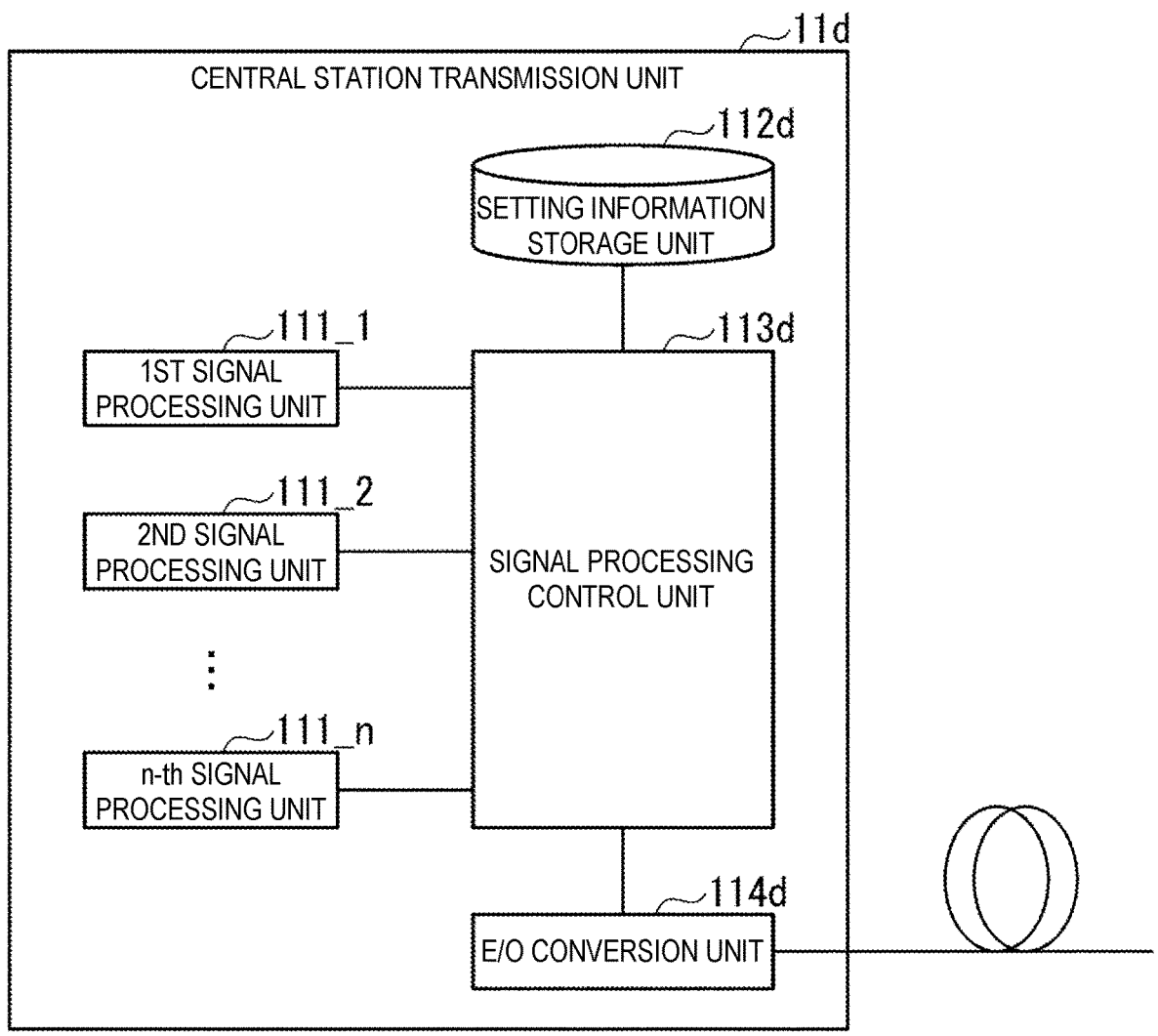
FIG. 17 is a diagram illustrating a functional configuration example of a central station transmission unit 11d according to a fifth embodiment.

FIG. 17 is a diagram illustrating a functional configuration example of a central station transmission unit 11d according to the fifth embodiment. In the fifth embodiment, a single antenna in the base station device 2 is shared with a plurality of wireless systems. The central station transmission unit 11d includes the plurality of signal processing units 111 (111_1 to 111_n: 'n' is an integer of 2 or larger), a setting information storage unit 112d, a signal processing control unit 113d, and an E/O conversion unit 114d. In the fifth embodiment, signals are multiplexing-transmitted by WDM via the optical transmission path 4 between the central station device 1 and the base station device 2, and signals are multiplexing-transmitted by SDM between the base station device 2 and the terminal device 3. For WDM, used are the number of wavelengths equal to or more than the number of the wireless systems sharing a single antenna. For SDM, an array antenna is used.

The signal processing unit 111 operates in accordance with the type of wireless system allocated in advance. The configuration of the signal processing unit 111 is the same as that of the first embodiment, so that detailed explanations will be omitted.

The setting information storage unit 112d is configured by using a storage device such as a magnetic hard disk device, a semiconductor memory device, or the like. The setting information storage unit 112d stores information regarding multiplexing of the electrical signals outputted from each of the signal processing units 111. The setting information storage unit 112d may store information indicating wavelengths to which the signals outputted from each of the signal processing units 111 are allocated, for example.

The signal processing control unit 113d outputs the electrical signals outputted from the plurality of signal processing units 111 to the E/O conversion unit 114d. Furthermore, the signal processing control unit 113d integrates the electrical signals corresponding to the control signals among the electrical signals outputted from the plurality of signal processing units 111 into the number (one, for example) that is less than the number of the wireless systems. In the embodiment, the control signals are integrated into a single electrical signal. The signal processing control unit 113d outputs the integrated signal (control signal) to the E/O conversion unit 114d. Furthermore, the signal processing control unit 113d outputs each of the electrical signals such that intensity modulation is performed for the optical signals of the wavelengths corresponding to the wireless systems of each of the electrical signals.

The E/O conversion unit 114d emits light of a plurality of wavelengths. For the light of each of the wavelengths, the E/O conversion unit 114d performs intensity modulation on the electrical signal of the wireless system corresponding thereto to generate a WDM signal (an optical signal). The E/O conversion unit 114d outputs the generated optical signal to the optical transmission path 4.

Figure 18:
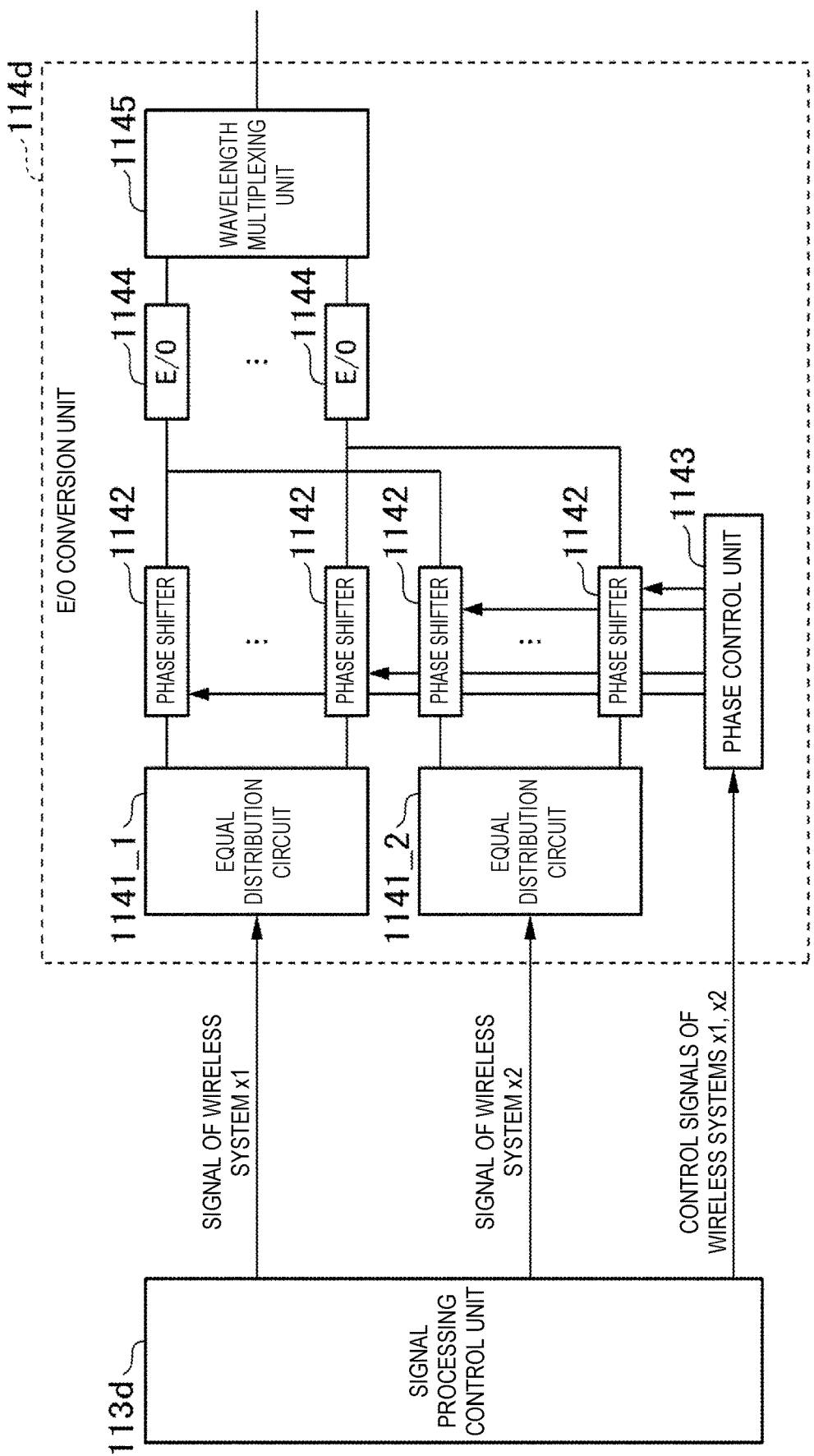
FIG. 18 is a diagram illustrating a specific example of a configuration of an E/O conversion unit 114d according to the fifth embodiment.

FIG. 18 is a diagram illustrating a specific example of a configuration of the E/O conversion unit 114d according to the fifth embodiment. The E/O conversion unit 114d includes equal distribution circuits 1141 in the number corresponding to the number of wireless systems (the same number, for example), a plurality of phase shifters 1142, E/O conversion elements 1144, and a wavelength multiplexing unit 1145.

The signal processing control unit 113d outputs, to the E/O conversion unit 114d, the signals of each of the wireless systems and the integrated signal of the control signals of each of the wireless systems. The signals of each of the wireless systems are inputted to the equal distribution circuits 1141 corresponding to each of the wireless systems. The control signal is outputted to the phase control unit 1143.

The plurality of phase shifters 1142 are connected to each of the equal distribution circuits 1141. Operations of each of the phase shifters 1142 are controlled by the control unit 1143. Each of the phase shifters 1142 is connected to the corresponding E/O conversion element 1144. The E/O conversion element 1144 outputs the optical signal corresponding to the electrical signals outputted from the plurality of phase shifters 1142.

For example, the electrical signal corresponding to the wireless system x1 is inputted to the equal distribution circuit 1141_1 corresponding to the wireless system x1. The equal distribution circuit 1101 corresponding to the wireless system x1 distributes the electrical signal to the plurality of phase shifters 1142 connected to itself. Each of the phase shifters 1142 performs phase control of each of the electrical signals according to the control of the control unit 1143. Each of the phase shifters 1142 outputs the phase-controlled electrical signal to the E/O conversion element 1144. Each of the E/O conversion elements 1144 converts the inputted electrical signal to the optical signal and outputs it to the wavelength multiplexing unit 1145. The wavelength multiplexing unit 1145 wavelength-multiplexes the optical signals generated from the signals of each of the wireless systems to generate a multiplex signal of WDM. The wavelength multiplexing unit 1145 sends out the multiplex signal to the optical transmission path 4.

The control unit 1143 acquires the electrical signal (control signal) outputted from the signal processing control unit 113d. The control unit 1143 outputs the control signal for each of the phase shifters 1142 according to the control signal. Each of the control signals include a signal indicating the content of phase control performed in each of the phase shifters 1142.

Figure 19:
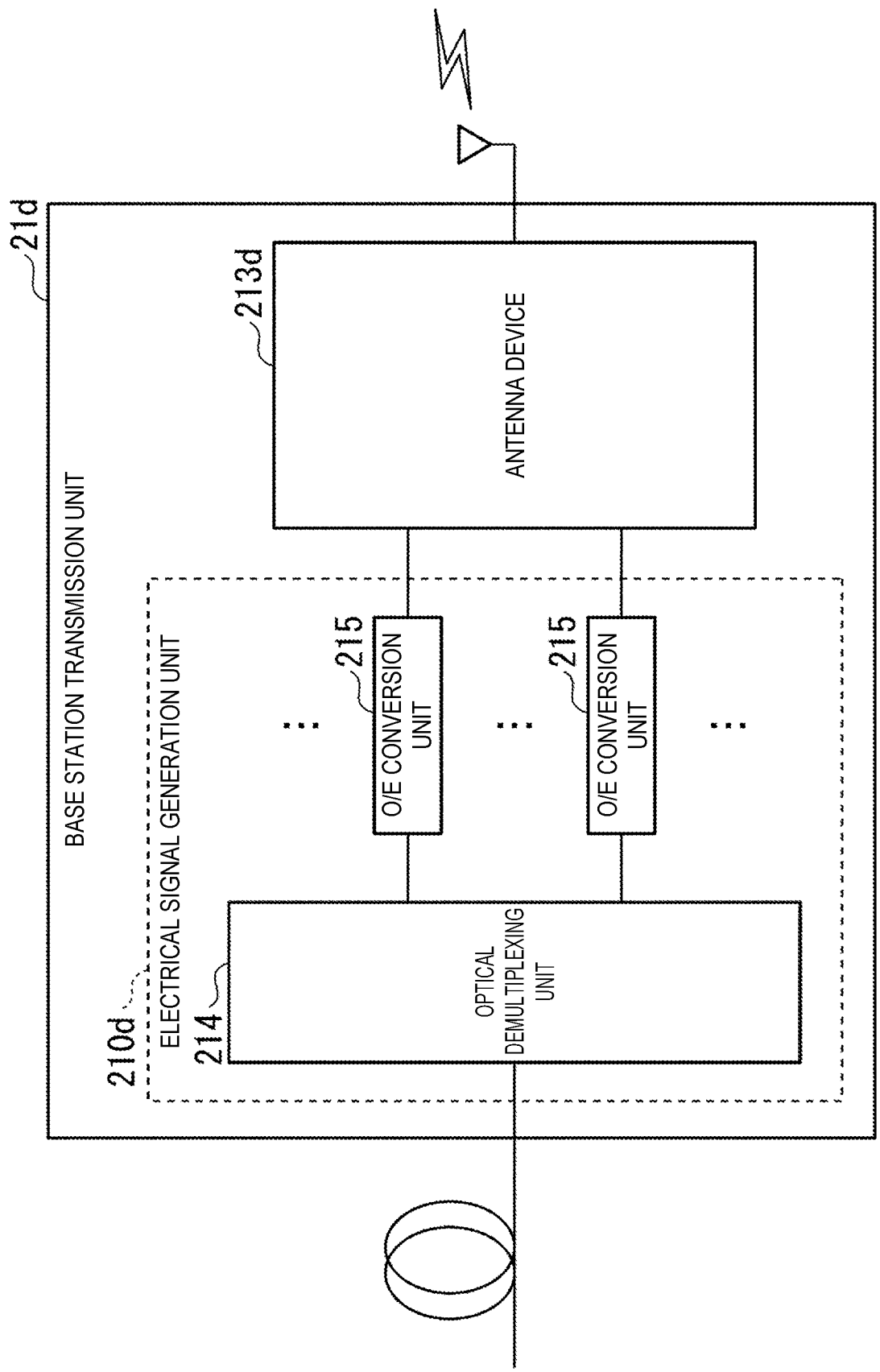
FIG. 19 is a diagram illustrating a functional configuration example of a base station transmission unit 21d according to the fifth embodiment.

FIG. 19 is a diagram illustrating a functional configuration example of a base station transmission unit 21d according to the fifth embodiment. The base station transmission unit 21d according to the fifth embodiment receives the optical signal multiplexed by WDM from the optical transmission path 4. The base station transmission unit 21d includes an electrical signal generation unit 210d and at least one antenna device 213d.

The electrical signal generation unit 210d receives the optical signal from the optical transmission path 4, and converts the received optical signal into a plurality of electrical signals. The electrical signal generation unit 210d includes the optical demultiplexing unit 214 and the plurality of O/E conversion units 215.

The optical demultiplexing unit 214 demultiplexes the optical signal received from the optical transmission path 4 according to the wavelengths. The optical demultiplexing unit 214 outputs the demultiplexed optical signals of each of the wavelengths to the O/E conversion units 215 corresponding to the wavelengths.

The O/E conversion unit 215 converts the optical signal outputted from the optical demultiplexing unit 214 into the electrical signal. The O/E conversion unit 215 outputs the converted electrical signal to the antenna device 213d corresponding to itself. The plurality of O/E conversion units 215 are connected to a single common antenna device 213d. Note that while only a single antenna device 213d is illustrated in FIG. 19, a single base station transmission unit 21d may include a plurality of antenna devices 213d.

The antenna device 213d is configured by using an array antenna. The plurality of O/E conversion units 215 are connected to the antenna device 213d. The antenna device 213d emits the electrical signal outputted from the O/E conversion unit 215 into the air as the wireless signal.

Figure 20:
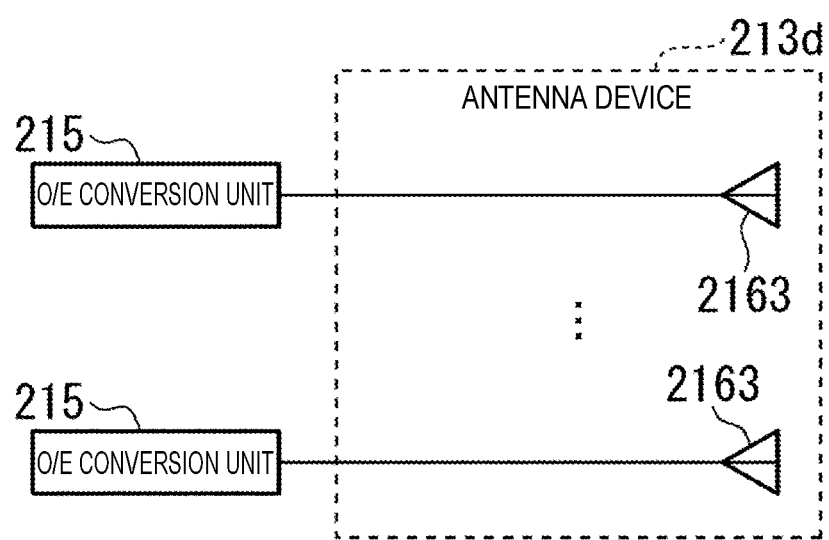
FIG. 20 is a diagram illustrating a specific example of a configuration of an antenna device 213d according to the fifth embodiment.

FIG. 20 is a diagram illustrating a specific example of a configuration of the antenna device 213d according to the fifth embodiment. As described above, the antenna device 213d includes the plurality of antenna elements 2163. The electrical signal outputted from the O/E conversion unit 215 is already being phase-controlled in the central station transmission unit 11d. Therefore, space division multiplexing (SDM) is implemented when the electrical signal outputted from the O/E conversion unit 215 is radiated from each of the antenna elements 2163 configuring the array antenna.

Sixth Embodiment

Figure 21:
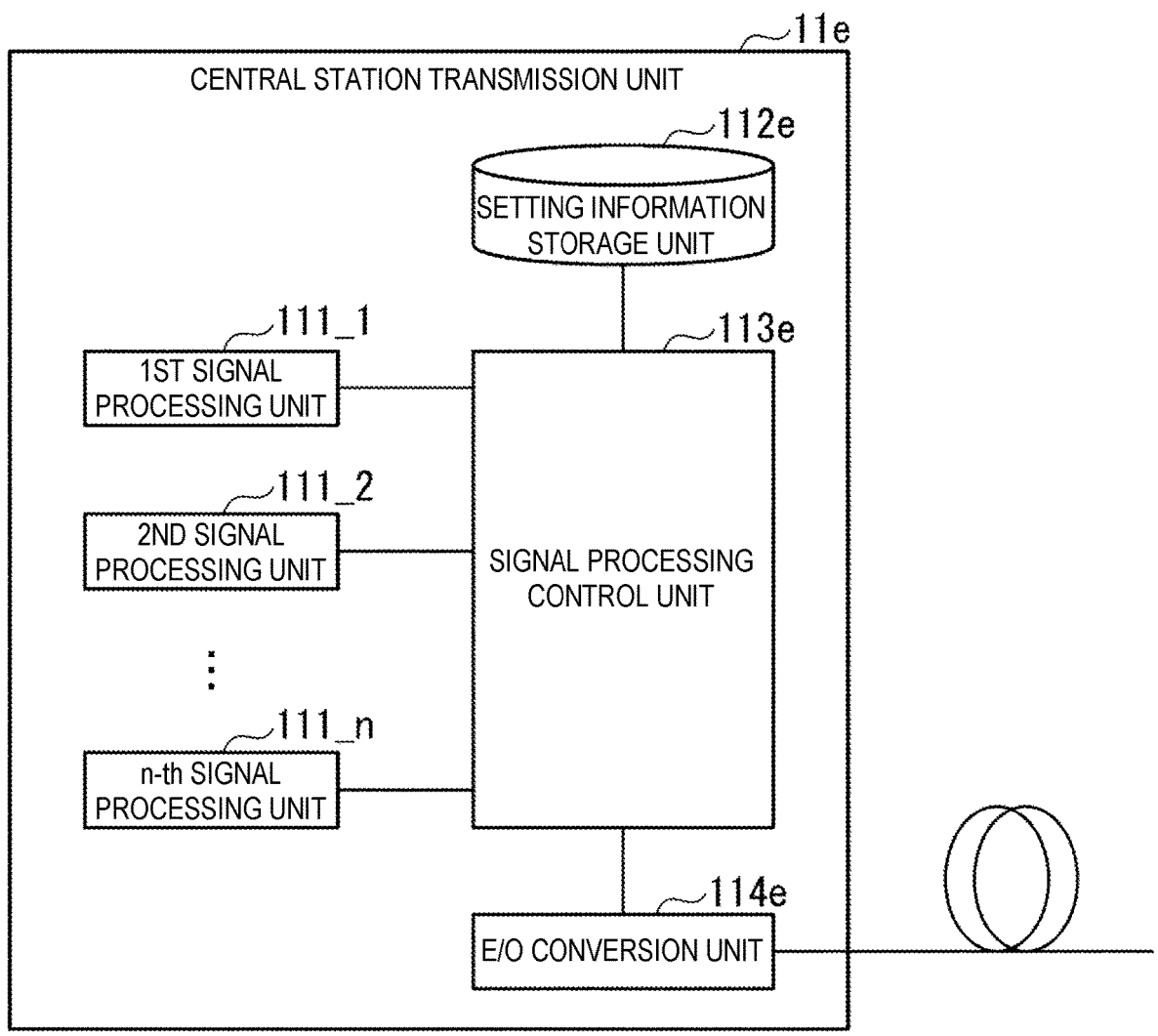
FIG. 21 is a diagram illustrating a functional configuration example of a central station transmission unit 11e according to a sixth embodiment.

FIG. 21 is a diagram illustrating a functional configuration example of a central station transmission unit 11e according to the sixth embodiment. In the sixth embodiment, a single antenna in the base station device 2 is shared with a plurality of wireless systems. The central station transmission unit 11e includes the plurality of signal processing units 111 (111_1 to 111_n: 'n' is an integer of 2 or larger), a setting information storage unit 112e, a signal processing control unit 113e, and an E/O conversion unit 114e. In the sixth embodiment, signals are multiplexing-transmitted by WDM via the optical transmission path 4 between the central station device 1 and the base station device 2, and signals are multiplexing-transmitted by SDM between the base station device 2 and the terminal device 3. For WDM, used are the number of wavelengths equal to or more than the number of the wireless systems sharing a single antenna. For SDM, an antenna device 213e forming a beam is used.

The signal processing unit 111 operates in accordance with the type of wireless system allocated in advance. The configuration of the signal processing unit 111 is the same as that of the first embodiment, so that detailed explanations will be omitted.

The setting information storage unit 112e is configured by using a storage device such as a magnetic hard disk device, a semiconductor memory device, or the like. The setting information storage unit 112e stores information regarding multiplexing of the electrical signals outputted from each of the signal processing units 111. The setting information storage unit 112e may store information indicating wavelengths to which the signals outputted from each of the signal processing units 111 are allocated, for example.

The signal processing control unit 113e outputs the electrical signals outputted from the plurality of signal processing units 111 to the E/O conversion unit 114e. Furthermore, the signal processing control unit 113e integrates the electrical signals corresponding to the control signals among the electrical signals outputted from the plurality of signal processing units 111 into the number (one, for example) that is less than the number of the wireless systems. In the embodiment, the control signals are integrated into a single electrical signal. The signal processing control unit 113e outputs the integrated signal (control signal) to the E/O conversion unit 114e. Furthermore, the signal processing control unit 113e outputs each of the electrical signals such that intensity modulation is performed for the optical signals of the wavelengths corresponding to the wireless systems of each of the electrical signals.

The E/O conversion unit 114e emits light of a plurality of wavelengths. For the light of each of the wavelengths, the E/O conversion unit 114e performs intensity modulation on the electrical signal of the wireless system corresponding thereto to generate a WDM signal (an optical signal). The E/O conversion unit 114e outputs the generated optical signal to the optical transmission path 4.

Figure 22:
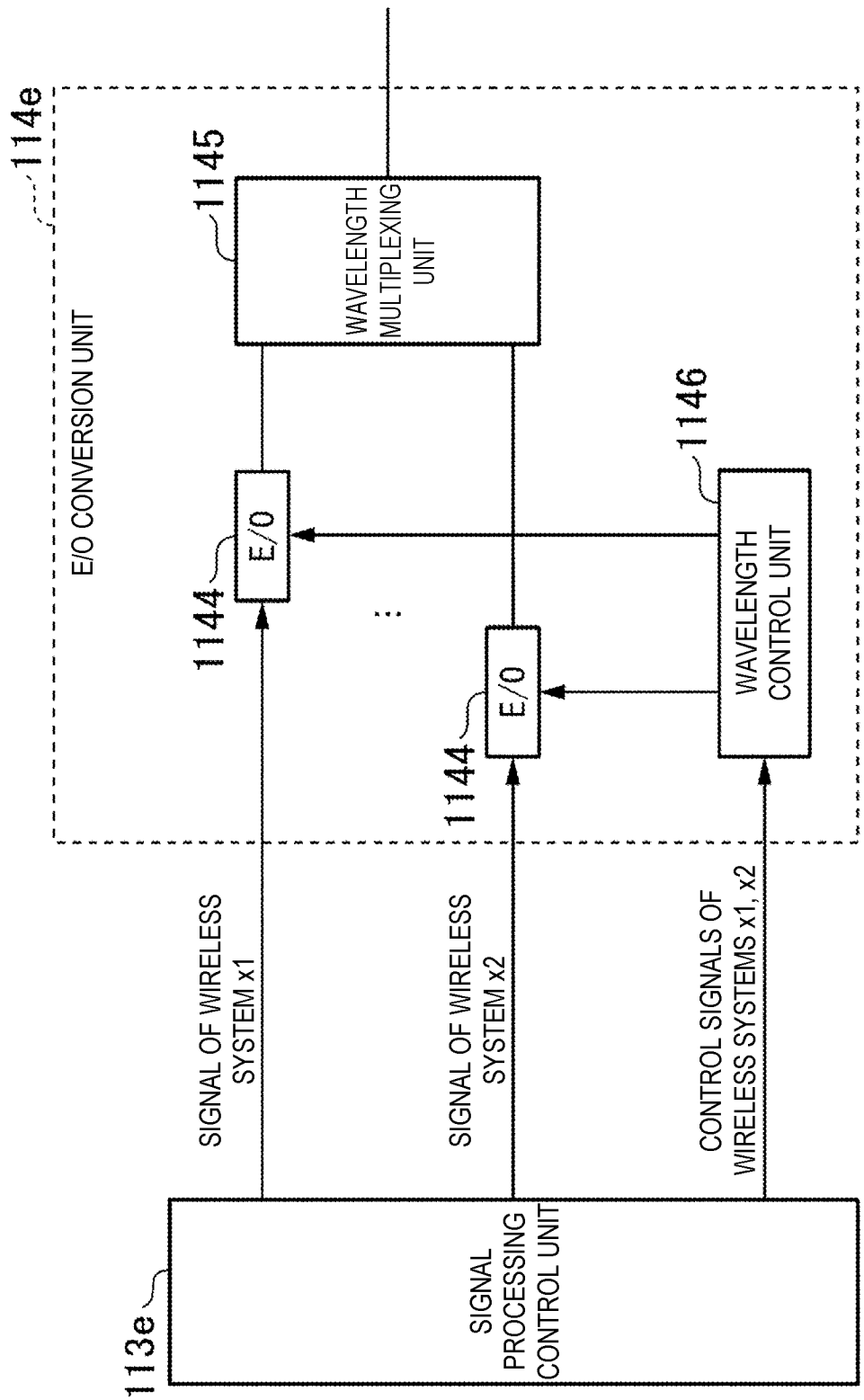
FIG. 22 is a diagram illustrating a specific example of a configuration of an E/O conversion unit 114e according to the sixth embodiment.

FIG. 22 is a diagram illustrating a specific example of a configuration of the E/O conversion unit 114e according to the sixth embodiment. The E/O conversion unit 114e includes the E/O conversion elements 1144 in the number corresponding to the number of wireless systems (the same number, for example), the wavelength multiplexing unit 1145, and a wavelength control unit 1146.

The signal processing control unit 113e outputs, to the E/O conversion unit 114e, the signals of each of the wireless systems and the integrated signal of the control signals of each of the wireless systems. The signals of each of the wireless systems are inputted to the E/O conversion elements 1144 corresponding to each of the wireless systems. The control signal is outputted to the wavelength control unit 1146.

The wavelength multiplexing unit 1145 is connected to each of the E/O conversion elements 1144. The wavelength control unit 1146 controls the wavelengths of the optical signals outputted from each of the E/O conversion elements 1144. Each of the E/O conversion elements 1144 performs intensity modulation on the electrical signals of each of the wireless systems for the optical signals of the wavelengths corresponding to each of the wireless systems. Each of the E/O conversion elements 1144 outputs the optical signals generated in this manner to the wavelength multiplexing unit 1145.

the wavelength multiplexing unit 1145 wavelength-multiplexes the optical signals generated from the signals of each of the wireless systems to generate a multiplex signal of WDM. The wavelength multiplexing unit 1145 sends out the multiplex signal to the optical transmission path 4.

The wavelength control unit 1146 acquires the electrical signal (control signal) outputted from the signal processing control unit 113e. The wavelength control unit 1146 outputs the control signal for each of the E/O conversion elements 1144 according to the control signal. Each of the control signals include a signal indicating the wavelength of the optical signal outputted in each of the E/O conversion elements 1144.

Figure 23:
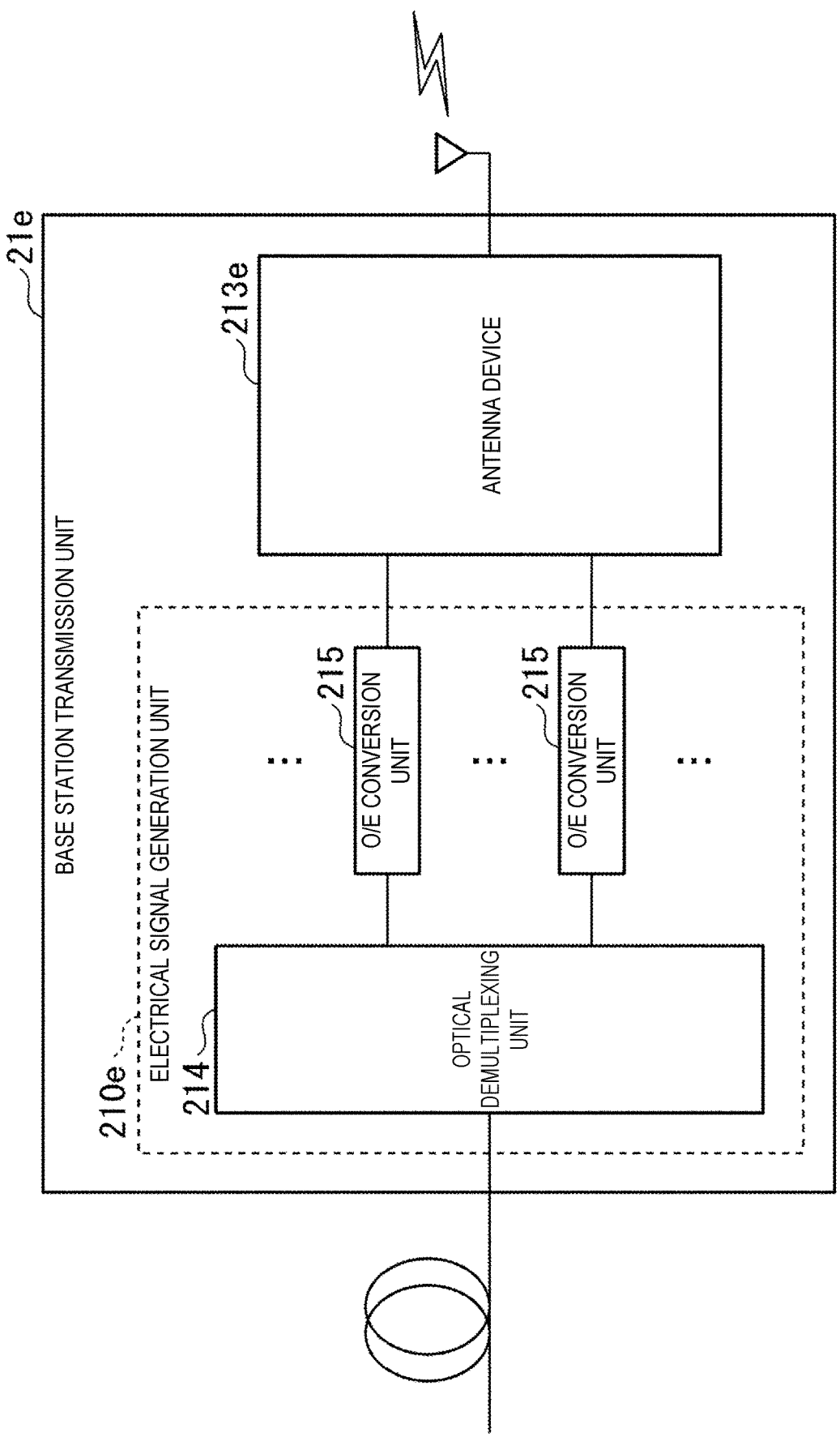
FIG. 23 is a diagram illustrating a functional configuration example of a base station transmission unit 21e according to the sixth embodiment.

FIG. 23 is a diagram illustrating a functional configuration example of a base station transmission unit 21e according to the sixth embodiment. The base station transmission unit 21e according to the sixth embodiment receives the optical signal multiplexed by WDM from the optical transmission path 4. The base station transmission unit 21e includes an electrical signal generation unit 210e and at least one antenna device 213e.

The electrical signal generation unit 210e receives the optical signal from the optical transmission path 4, and converts the received optical signal into a plurality of electrical signals. The electrical signal generation unit 210e includes the optical demultiplexing unit 214 and the plurality of O/E conversion units 215.

The optical demultiplexing unit 214 demultiplexes the optical signal received from the optical transmission path 4 according to the wavelengths. The optical demultiplexing unit 214 outputs the demultiplexed optical signals of each of the wavelengths to the O/E conversion units 215 corresponding to the wavelengths.

The O/E conversion unit 215 converts the optical signal outputted from the optical demultiplexing unit 214 into the electrical signal. The O/E conversion unit 215 outputs the converted electrical signal to the antenna device 213e. The plurality of O/E conversion units 215 are connected to a single common antenna device 213e. Note that while only a single antenna device 213e is illustrated in FIG. 23, a single base station transmission unit 21e may include a plurality of antenna devices 213e.

The antenna device 213e is configured by using a device capable of performing beamforming. Hereinafter, three devices (a beamforming network, a reflect array, and a transmit array) will be described as specific examples of the antenna device 213e.

(Beamforming Network)

Figure 24:
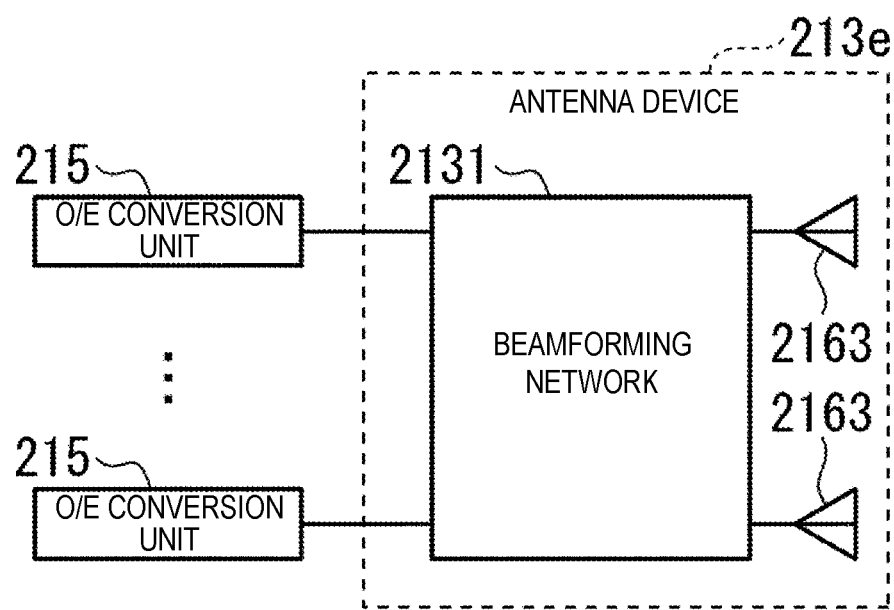
FIG. 24 is a diagram illustrating a specific example of an antenna device 213e.
Figure 25:
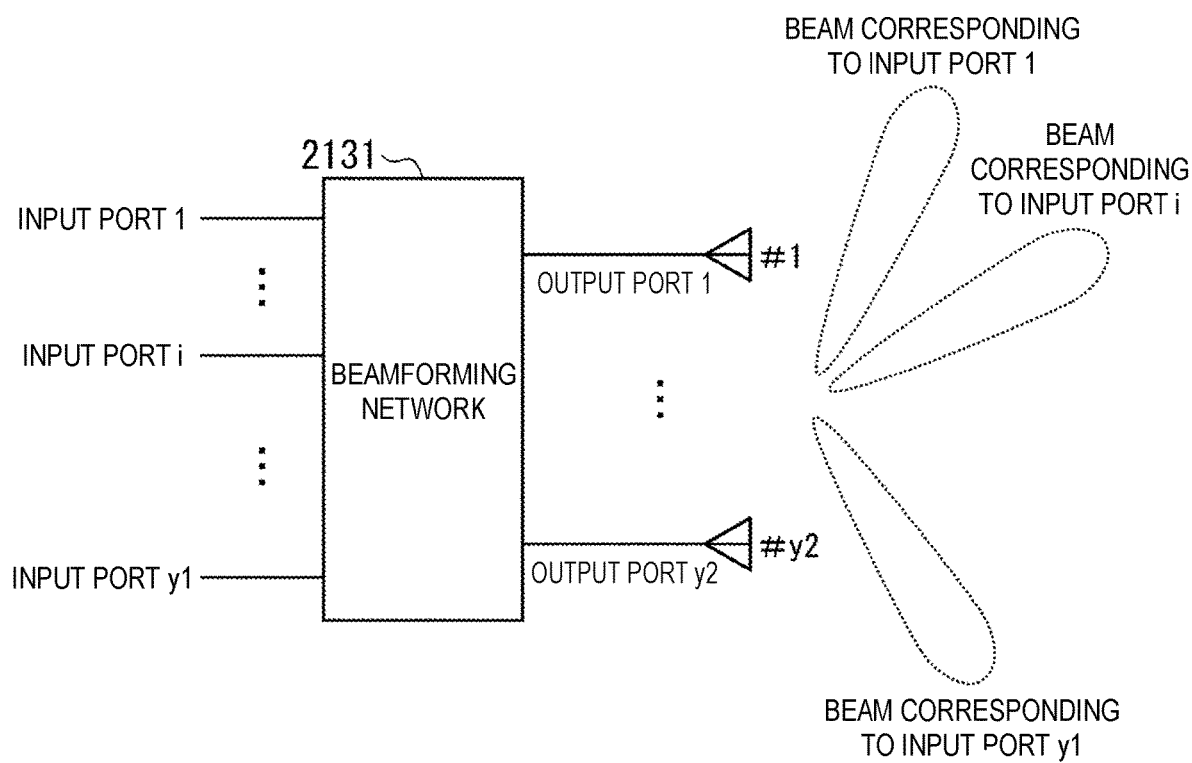
FIG. 25 is a diagram illustrating a schematic view of a beamforming network 2131.

FIG. 24 is a diagram illustrating a specific example of the antenna device 213e. In FIG. 24, the antenna device 213e is configured by using a beamforming network 2131. FIG. 25 is a diagram illustrating a schematic view of the beamforming network 2131. The beamforming network 2131 outputs signals with a phase difference from output ports when a signal is inputted from an input port. Therefore, by using the beamforming network 2131, it is possible to form a beam in the direction corresponding to the input port. As specific examples of such a beamforming network, there may be Butler matrix, Blass matrix, Nolan matrix, Rotman lens, and the like. A following reference literature also describes the beamforming network.

Reference Literature: Luo, Q., Gao, S. S., Liu, W., & Gu, C. (2019), "Low-cost Smart Antennas", Wiley, pp. 253-265

In the case illustrated in FIG. 25, the beamforming network 2131 includes y1-pieces of input ports and y2-pieces of output ports. When a wireless signal is inputted to one input port, the beamforming network 2131 outputs, from the y2-pieces of output ports, wireless signals of same amplitude with linearly inclined phases. Furthermore, the outputted phase inclination varies for each of the input ports to which the signal is inputted. Therefore, the beamforming network 2131 can form the beam toward the direction in accordance with the input port. With input/output reversibility, when a wireless signal arrives from the direction of the beam corresponding to the input port i, the wireless signal is outputted only from the input port i. By using such a characteristic, it is also possible to perform the processing for uplink signals. As illustrated in FIG. 24, each of the O/E conversion units 215 is connected to a specific input port of the beamforming network 2131. Therefore, when a signal corresponding to a wireless system is inputted to the beamforming network 2131 from the O/E conversion unit 215, a beam corresponding to the input port to which the signal is inputted is formed and outputted from the antenna elements 2163.

(Reflect Array)

Figure 26:
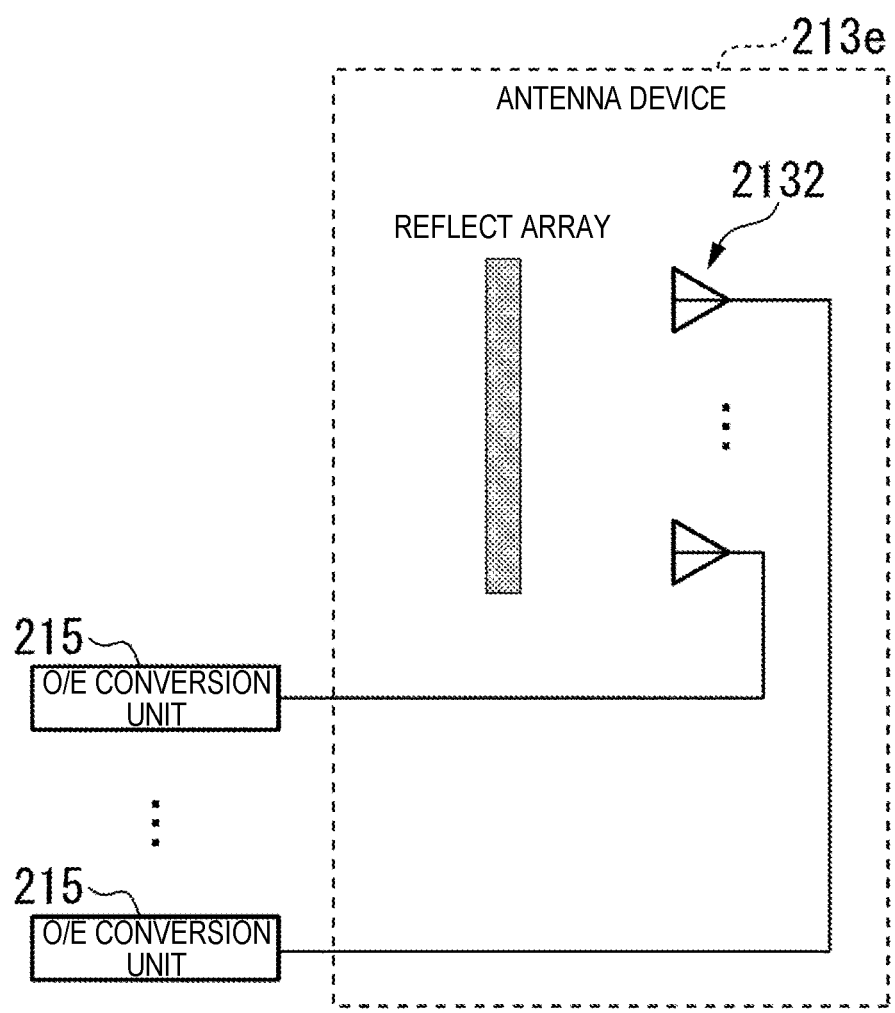
FIG. 26 is a diagram illustrating a specific example of the antenna device 213e.
Figure 27:
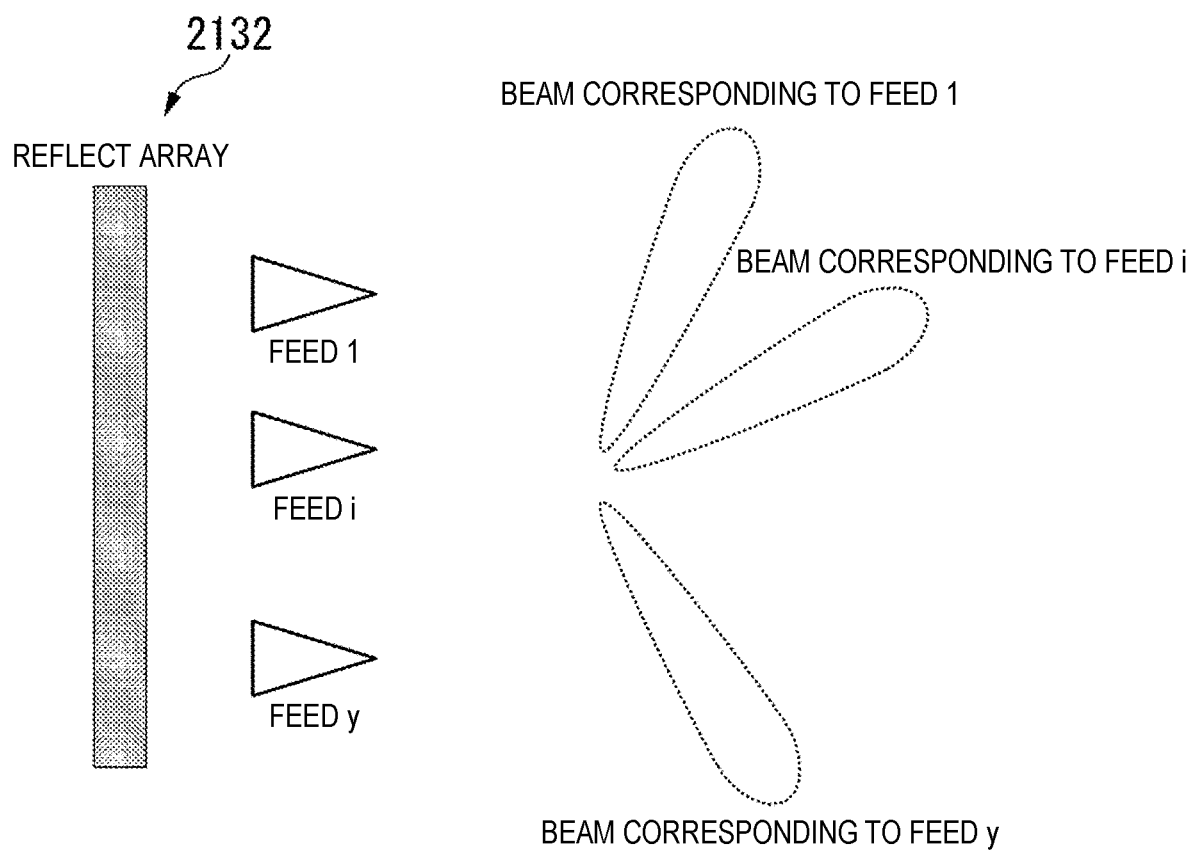
FIG. 27 is a diagram illustrating a schematic view of a reflect array 2132.

FIG. 26 is a diagram illustrating a specific example of the antenna device 213e. In FIG. 26, the antenna device 213e is configured by using a reflect array 2132. FIG. 27 is a diagram illustrating a schematic view of the reflect array 2132. When a wireless signal is radiated from a feed, the reflect array 2132 reflects the wireless signal with a phase difference toward the direction according to the position of the feed. Therefore, by using the reflect array 2132, it is possible to form a beam in the direction corresponding to the feed.

In the case illustrated in FIG. 27, the reflect array 2132 includes y-pieces of feeds. When a wireless signal is radiated from a certain feed, the phase thereof is linearly inclined when reflected at the reflect array, so that a beam is formed in a specific direction. The inclination of the phase varies depending on the feed. Therefore, as for the wireless signals radiated from the feeds, the beams are formed toward the different directions corresponding to the respective feeds as the radiation source. With input/output reversibility, when a wireless signal arrives from the direction of the beam corresponding to the feed i, the wireless signal reflected at the reflect array converges only on the feed i. By using such a characteristic, it is also possible to perform the processing for uplink signals.

As illustrated in FIG. 26, each of the O/E conversion units 215 is connected to a specific feed of the reflect array 2132. Therefore, when a signal corresponding to a wireless system is inputted to the reflect array 2132 from the O/E conversion unit 215, a beam corresponding to the feed to which the signal is inputted is formed and outputted.

(Transmit Array)

Figure 28:
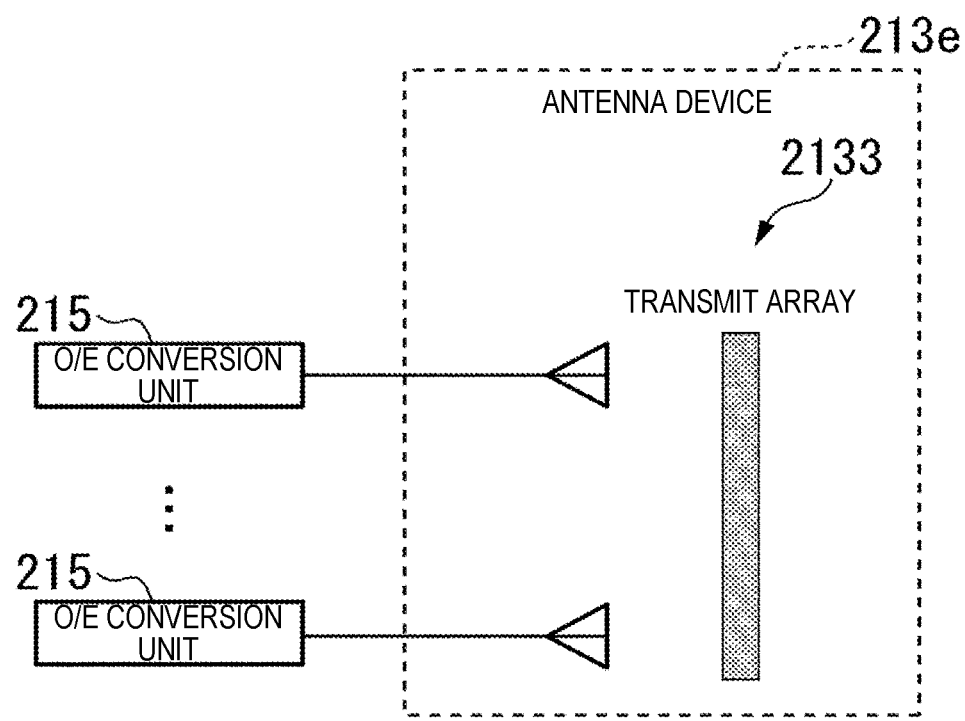
FIG. 28 is a diagram illustrating a specific example of the antenna device 213e.
Figure 29:
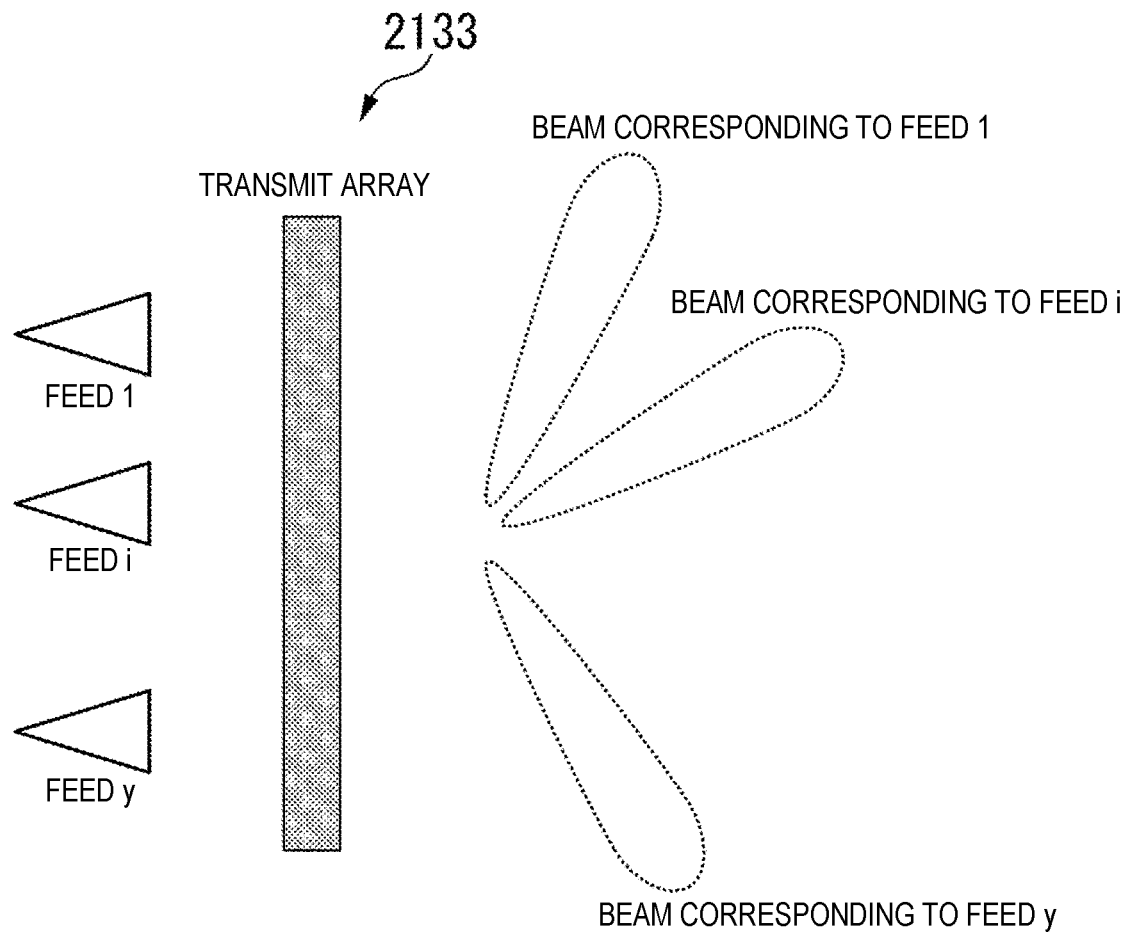
FIG. 29 is a diagram illustrating a schematic view of a transmit array 2133.

FIG. 28 is a diagram illustrating a specific example of the antenna device 213e. In FIG. 28, the antenna device 213e is configured by using a transmit array 2133. FIG. 29 is a diagram illustrating a schematic view of the transmit array 2133. When a wireless signal is radiated from a feed, the transmit array 2133 transmits the wireless signal with a phase difference toward the direction according to the position of the feed. Therefore, by using the transmit array 2133, it is possible to form a beam in the direction corresponding to the feed.

In the case illustrated in FIG. 29, the transmit array 2133 includes y-pieces of feeds. When a wireless signal is radiated from a certain feed, the phase thereof is linearly inclined when transmitting through the transmit array, so that a beam is formed in a specific direction. The inclination of the phase varies depending on the feed. Therefore, as for the wireless signals radiated from the feeds, the beams are formed toward the different directions corresponding to the respective feeds as the radiation source. With input/output reversibility, when a wireless signal arrives from the direction of the beam corresponding to the feed i, the wireless signal transmitted through the transmit array converges only on the feed i. By using such a characteristic, it is also possible to perform the processing for uplink signals.

As illustrated in FIG. 28, each of the O/E conversion units 215 is connected to a specific feed of the transmit array 2133. Therefore, when a signal corresponding to a wireless system is inputted to the transmit array 2133 from the O/E conversion unit 215, a beam corresponding to the feed to which the signal is inputted is formed and outputted.

As described above, the antenna device 213e forms the beams different for each of the O/E conversion units 215 (for each of the wireless systems). Therefore, when the electrical signals outputted from the O/E conversion units 215 are radiated from the antenna device 213e, space division multiplexing (SDM) can be implemented.

While the embodiments of the present invention have been described in detail with referring to the drawings heretofore, it is to be noted that the specific configuration thereof is not limited to the embodiments and that designs and the like falling within the scope of the present invention are included therein.

INDUSTRIAL APPLICABILITY

The present invention can be applied to optical communication such as RoF.

REFERENCE SIGNS LIST

100 Communication system
1 Central station device
2 Base station device
11 Central station transmission unit
111 Signal processing unit
112 Setting information storage unit
113 Signal processing control unit
114 E/O conversion unit
12 Central station reception unit
121 O/E conversion unit
122 Setting information storage unit
123 Signal processing control unit
124 Signal processing unit
21 Base station transmission unit
211 O/E conversion unit
212 Demultiplexing unit
213 Antenna device
216 Optical demultiplexing unit
217 O/E conversion unit
218 Demultiplexing unit
219 Antenna device
22 Base station reception unit
221 Antenna device
222 Multiplexing unit
223 E/O conversion unit
224 E/O conversion unit
225 Optical multiplexing unit
226 Antenna device
227 Multiplexing unit
228 E/O conversion unit
229 Optical multiplexing unit
3 Terminal device
4 Optical transmission path

The invention claimed is:

1. A communication system comprising a central station device and a base station device,
wherein the central station device comprises:
a plurality of signal processing units, implemented using one or more computing devices, each configured to generate an electrical signal of a wireless signal by performing signal processing corresponding to a wireless system;
a conversion unit, implemented using one or more computing devices, configured to generate an optical signal by performing intensity modulation on the electrical signal;
a signal processing control unit, implemented using one or more computing devices, configured to control the conversion unit to generate an optical signal in which a plurality of the electrical signals are multiplexed, wherein:
the signal processing control unit generates the optical signal by multiplexing the plurality of electrical signals outputted from the plurality of signal processing units that generate wireless signals of a same frequency band to be wirelessly transmitted from a same one of the antenna devices, and
the base station device comprises:
an electrical signal generation unit, implemented using one or more computing devices, configured to:
receive the optical signal generated in the central station device via an optical transmission path, and
convert the received optical signal into a plurality of electrical signals; and
a plurality of antenna devices, each configured to wirelessly transmit the wireless signal according to the electrical signal generated by the electrical signal generation unit.

2. The communication system according to claim 1, wherein the signal processing control unit generates the optical signal by multiplexing the plurality of electrical signals outputted from the plurality of signal processing units through allocating the plurality of electrical signals to subcarriers that are different from each other.

3. The communication system according to claim 1, wherein the signal processing control unit generates the optical signal by multiplexing the plurality of electrical signals outputted from the plurality of signal processing units through allocating the plurality of electrical signals to optical signals of wavelengths that are different from each other.

4. The communication system according to claim 1, wherein the signal processing control unit generates the optical signal by multiplexing the plurality of electrical signals outputted from the plurality of signal processing units through allocating the plurality of electrical signals to combinations of subcarriers and wavelengths different from each other.

5. A communication method comprising:
generating a plurality of electrical signals of wireless signals by performing signal processing corresponding to wireless systems;
generating and outputting an optical signal to an optical transmission path by performing intensity modulation on the plurality of electrical signals, including:
generating the optical signal by multiplexing the plurality of electrical signals of signal processing units that generate wireless signals of a same frequency band to be wirelessly transmitted from a same one of the antenna devices;
receiving the optical signal via the optical transmission path and converting the received optical signal into a plurality of electrical signals; and
wirelessly transmitting each of the electrical signals from antenna devices corresponding to the converted plurality of electrical signals.

6. A central station device comprising:
a plurality of signal processing units, implemented using one or more computing devices, each configured to generate an electrical signal of a wireless signal by performing signal processing corresponding to a wireless system;
a conversion unit, implemented using one or more computing devices, configured to:
generate an optical signal by performing intensity modulation on the electrical signal, and
output the optical signal to an optical transmission path; and
a signal processing control unit, implemented using one or more computing devices, configured to control the conversion unit to generate an optical signal in which a plurality of the electrical signals are multiplexed, wherein the optical signal is generated by multiplexing the plurality of electrical signals outputted from the plurality of signal processing units that generate wireless signals of a same frequency band to be wirelessly transmitted from a same one of antenna devices of a base station.

7. The central station device according to claim 6, wherein the signal processing control unit generates the optical signal by multiplexing the plurality of electrical signals outputted from the plurality of signal processing units through allocating the plurality of electrical signals to subcarriers that are different from each other.

8. The central station device according to claim 6, wherein the signal processing control unit generates the optical signal by multiplexing the plurality of electrical signals outputted from the plurality of signal processing units through allocating the plurality of electrical signals to optical signals of wavelengths that are different from each other.

9. The central station device according to claim 6, wherein the signal processing control unit generates the optical signal by multiplexing the plurality of electrical signals outputted from the plurality of signal processing units through allocating the plurality of electrical signals to combinations of subcarriers and wavelengths different from each other.

* * * * *